US012735644B2

(12) United States Patent
Wu et al.

(10) Patent No.: US 12,735,644 B2
(45) **Date of Patent: *Sep. 15, 2026**

(54) RECOVERY OF RECYCLE CONTENT $CO_2$ FROM PYROLYSIS FLUE GAS

(71) Applicant: ExxonMobil Product Solutions Company, Spring, TX (US)

(72) Inventors: Xianchun Wu, Longview, TX (US); Avery L. Anderson, Longview, TX (US); Daryl Bitting, Longview, TX (US); Michael Gary Polasek, Longview, TX (US); David Eugene Slivensky, Tatum, TX (US)

(73) Assignee: ExxonMobil Product Solutions Company, Spring, TX (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/691,476

(22) PCT Filed: Sep. 16, 2022

(86) PCT No.: PCT/US2022/043753

§ 371 (c)(1),
(2) Date: Mar. 13, 2024

(87) PCT Pub. No.: WO2023/049035

PCT Pub. Date: Mar. 30, 2023

(65) Prior Publication Data

US 2024/0392195 A1 Nov. 28, 2024

Related U.S. Application Data

(60) Provisional application No. 63/261,423, filed on Sep. 21, 2021.

(51) Int. Cl.
*C10G 1/10* (2006.01)
*B01D 53/14* (2006.01)
(Continued)

(52) U.S. Cl.
CPC .......... *C10G 1/10* (2013.01); *B01D 53/1475* (2013.01); *B01D 53/62* (2013.01); *C10B 53/07* (2013.01);
(Continued)

(58) Field of Classification Search
CPC ................ B01D 53/62; B01D 53/1475; B01D 2257/504; C10K 1/004; C10K 1/16;
(Continued)

(56) References Cited

U.S. PATENT DOCUMENTS 3,544,291 A 12/1970 Schlinger et al.
4,220,454 A 9/1980 Ban et al.
(Continued)

FOREIGN PATENT DOCUMENTS

CN 203582812 U 5/2014
CN 105238434 B1 3/2017
(Continued)

OTHER PUBLICATIONS

Co-pending U.S. Appl. No. 17/755,326, filed Apr. 27, 2022; Wu et al.
(Continued)

*Primary Examiner* — Vishal V Vasisth
(74) *Attorney, Agent, or Firm* — C. Tumey Law Group PLLC

(57) ABSTRACT

A process and system for recovering a recycle content carbon dioxide is provided that can lower the carbon footprint and global warming potential of a chemical recycling facility. More particularly, a pyrolysis flue gas and/or a pyrolysis gas from waste plastic pyrolysis may be treated in an absorber system to thereby form a recovered $CO_2$ stream comprising recycle content carbon dioxide. Thus, the global
(Continued)

warming potential of the chemical recycling facility may be optimized and lowered due to the carbon dioxide recovery process and system herein.

9 Claims, 3 Drawing Sheets

(51) Int. Cl.
*B01D 53/62* (2006.01)
*C10B 53/07* (2006.01)
*C10J 3/46* (2006.01)

(52) U.S. Cl.
CPC ......... *C10J 3/466* (2013.01); *B01D 2257/504* (2013.01); *C10G 2300/1003* (2013.01); *C10G 2300/4043* (2013.01); *C10J 2300/0969* (2013.01); *C10J 2300/1603* (2013.01); *C10J 2300/1846* (2013.01)

(58) Field of Classification Search
CPC .... C10G 2300/1003; C10G 2300/4043; C10G 1/10; C10J 3/466; C10J 2300/0969; C10J 2300/1846; C10J 2300/1603; C10B 53/07
See application file for complete search history.

(56) References Cited

U.S. PATENT DOCUMENTS

| | | | |
|---|---|---|---|
| 4,588,850 | A | 5/1986 | Mueller et al. |
| 5,087,763 | A | 2/1992 | Sorensen |
| 5,792,340 | A | 8/1998 | Freel et al. |
| 5,841,011 | A | 11/1998 | Hashimoto et al. |
| 5,904,879 | A | 5/1999 | Winter et al. |
| 7,453,393 | B2 | 11/2008 | Duivenvoorden |
| 7,531,618 | B2 | 5/2009 | DeBruin |
| 8,183,422 | B2 | 5/2012 | Alegria et al. |
| 8,895,790 | B2 | 11/2014 | Narayanaswamy et al. |
| 9,096,801 | B2 | 8/2015 | Baker |
| 10,246,643 | B2 | 4/2019 | Gephart et al. |
| 10,655,070 | B2 | 5/2020 | Wheeler et al. |
| 2006/0251547 | A1 | 11/2006 | Windes et al. |
| 2007/0179326 | A1 | 8/2007 | Baker |
| 2009/0093600 | A1 | 4/2009 | Moore et al. |
| 2014/0228606 | A1 | 8/2014 | Narayanaswamy et al. |
| 2016/0122190 | A1 | 5/2016 | Schmelzer et al. |
| 2016/0264874 | A1 | 9/2016 | Narayanaswamy et al. |
| 2016/0264885 | A1 | 9/2016 | Narayanaswamy et al. |
| 2017/0158503 | A1 | 6/2017 | Foody et al. |
| 2017/0283707 | A1 | 10/2017 | Gephart et al. |
| 2019/0161683 | A1 | 5/2019 | Narayanaswamy et al. |
| 2019/0390124 | A1 | 12/2019 | Oprins et al. |
| 2020/0017772 | A1 | 1/2020 | Ramamurthy et al. |
| 2020/0362248 | A1 | 11/2020 | Cartolano et al. |
| 2021/0130699 | A1 | 5/2021 | Bitting et al. |
| 2021/0130708 | A1 | 5/2021 | Xu et al. |
| 2021/0130710 | A1 | 5/2021 | Xu et al. |
| 2021/0130712 | A1 | 5/2021 | Abudawoud et al. |
| 2021/0130713 | A1 | 5/2021 | Xu et al. |
| 2021/0130714 | A1 | 5/2021 | Abudawoud et al. |
| 2021/0130715 | A1 | 5/2021 | Xu et al. |
| 2021/0130717 | A1 | 5/2021 | Xu et al. |

FOREIGN PATENT DOCUMENTS

| | | | |
|---|---|---|---|
| CN | 112760116 | A | 5/2021 |
| FI | 20 205 131 | A1 | 12/2020 |
| JP | 07-216364 | A | 8/1995 |
| JP | 2000176403 | A | 6/2000 |
| JP | 2000313892 | A | 11/2000 |
| JP | 2018-511671 | A | 4/2018 |
| KR | 10-2000-0023759 | A | 4/2000 |
| WO | WO 95/09902 | A1 | 4/1995 |
| WO | WO 2004/018592 | A1 | 3/2004 |
| WO | WO 2010/051013 | A1 | 5/2010 |
| WO | WO 2010/062307 | A1 | 6/2010 |
| WO | WO 2015/100430 | A1 | 7/2015 |
| WO | WO 2016/142809 | A1 | 9/2016 |
| WO | WO 2017/146876 | A1 | 8/2017 |
| WO | WO 2018/005074 | A1 | 1/2018 |
| WO | WO 2018/055555 | A1 | 3/2018 |
| WO | WO 2018/069794 | A1 | 4/2018 |
| WO | WO 2019/056138 | A1 | 3/2019 |
| WO | WO 2020/252228 | A1 | 12/2020 |
| WO | WO 2021/063961 | A1 | 4/2021 |
| WO | WO 2021/084016 | A1 | 5/2021 |
| WO | WO 2021/087038 | A1 | 5/2021 |
| WO | WO 2021/087066 | A1 | 5/2021 |
| WO | WO 2021/163094 | A1 | 8/2021 |
| WO | WO 2021/163113 | A1 | 8/2021 |
| WO | WO 2021/163123 | A1 | 8/2021 |

OTHER PUBLICATIONS

USPTO Office Action dated Oct. 12, 2023 received in co-pending U.S. Appl. No. 17/755,326.
USPTO Office Action dated Jun. 13, 2024 received in co-pending U.S. Appl. No. 17/755,326.
Co-pending U.S. Appl. No. 17/083,592, filed Oct. 29, 2020; Wu. et al.
USPTO Office action dated Feb. 3, 2022 received in co-pending U.S. Appl. No. 17/083,592.
USPTO Office Action dated Sep. 12, 2022 received in co-pending U.S. Appl. No. 17/083,592.
USPTO Office Action dated Feb. 24, 2023 received in co-pending U.S. Appl. No. 17/086,592.
USPTO Offce Action dated Oct. 19, 2023 received in co-pending U.S. Appl. No. 17/083,592.
Co-pending U.S. Appl. No. 17/995,713, filed Oct. 7, 2022; DeBruin et al.
Co-pending U.S. Appl. No. 18/692,913, filed Mar. 18, 2024; Polasek et al.
Co-pending U.S. Appl. No. 18/692,880, filed Mar. 18, 2024; Aderson et al.
Co-pending U.S. Appl. No. 18/692,904, filed Mar. 18, 2024; Aderson et al.
Co-pending U.S. Appl. No. 18/691,481, filed Mar. 13, 2024; Slivensky et al.
Co-pending U.S. Appl. No. 18/691,643, filed Mar. 13, 2024; Slivensky et al.
Co-pending U.S. Appl. No. 18/691,596, filed Mar. 13, 2024; Slivensky et al.
Co-pending U.S. Appl. No. 18/691,472, filed Mar. 13, 2024; Wu et al.
Notification of Transmittal of the International Search Report and the Written Opinion of the International Searching Authority with Date of Mailing Jul. 30, 2021 for International Application No. PCT/US2021/027007.
Notification of Transmittal of the International Search Report and the Written Opinion of the International Searching Authority with Date of Mailing Aug. 25, 2022 for International Application No. PCT/US2022/026679.
Notification of Transmittal of the International Search Report and the Written Opinion of the International Searching Authority with Date of Mailing Dec. 9, 2022 for International Application No. PCT/US2022/043746.
Notification of Transmittal of the International Search Report and the Written Opinion of the International Searching Authority with Date of Mailing Dec. 13, 2022 for International Application No. PCT/US2022/043744.
Notification of Transmittal of the International Search Report and the Written Opinion of the International Searching Authority with Date of Mailing Dec. 19, 2022 for International Application No. PCT/US2022/043755.
Notification of Transmittal of the International Search Report and the Written Opinion of the International Searching Authority with Date of Mailing Dec. 28, 2022 for International Application No. PCT/US2022/043749.

(56) References Cited

OTHER PUBLICATIONS

Notification of Transmittal of the International Search Report and the Written Opinion of the International Searching Authority with Date of Mailing Dec. 30, 2022 for International Application No. PCT/US2022/043747.
Notification of Transmittal of the International Search Report and the Written Opinion of the International Searching Authority with Date of Mailing Jan. 2, 2023 for International Application No. PCT/US2022/043751.
Notification of Transmittal of the International Search Report and the Written Opinion of the International Searching Authority with Date of Mailing Feb. 24, 2023 for International Application No. PCT/US2022/043753.
Notification of Transmittal of the International Search Report and the Written Opinion of the International Searching Authority with Date of Mailing Feb. 27, 2023 for International Application No. PCT/US2022/043743.
ASTMD2887; "Standard Test Method for Boiling Range Distribution of Petroleum Fractions by Gas Chromatography"; Published Dec. 2023.
ASTMD5399; "Standard Test Method for Boiling Point Distribution of Hydrocarbon Solvents by Gas Chromatography"; Published Aug. 2023.

RECOVERY OF RECYCLE CONTENT $CO_2$ FROM PYROLYSIS FLUE GAS

CROSS-REFERENCE TO RELATED APPLICATION(S)

This application is a national stage filing under 35 USC § 371 of International Application Number PCT/US2022/043753, filed on, Sep. 16, 2022 which claims the benefit of the filing date to U.S. Provisional Application No. 63/261,423, filed on Sep. 21, 2021, the entire disclosures of which are incorporated by reference herein.

BACKGROUND

Waste plastic pyrolysis plays a part in a variety of chemical recycling technologies. Typically, waste plastic pyrolysis facilities focus on producing recycled content pyrolysis oil (r-pyoil) that can be used in making recycled content products. Waste plastic pyrolysis also produces heavy components (e.g., waxes, tar, and char) and recycled content pyrolysis gas (r-pygas). Although r-pygas produced by the waste plastic pyrolysis typically has 100 percent recycled content, it is common practice for the r-pygas to be burned as fuel to provide heat for the pyrolysis reaction. While burning r-pygas as fuel may be economically efficient, such practice runs counter to one of the main goals of chemical recycling, which is to transform as much of the waste plastic as possible into new products.

Additionally, the pyrolysis facilities may contain pyrolysis reactors that are heated via one or more furnaces using conventional fuel sources. The resulting flue gas generally comprises some quantity of carbon dioxide and/or other components that are undesirable for downstream separations and/or other chemical recycling processes. Thus, this pyrolysis flue gas is typically discarded from the pyrolysis facility, which can negatively impact the carbon footprint of the pyrolysis facility.

Consequently, even though recycle content products are being produced by these pyrolysis facilities, the environmental impact of the facilities may not be thoroughly analyzed so as to avoid releasing more carbon dioxide into the environment than is necessary. Therefore, such pyrolysis facilities may exhibit one or more process deficiencies that negatively impact the resulting global warming potential of the combined facilities. Thus, a processing scheme for waste plastic pyrolysis that provides a lower carbon footprint is needed.

SUMMARY

In one aspect, the present technology concerns a chemical recycling process. Generally, the process comprises: (a) burning a fuel to provide heat to a waste plastic pyrolysis reaction and to thereby form a pyrolysis effluent and a pyrolysis flue gas; (b) recovering $CO_2$ from at least a portion of the pyrolysis flue gas to thereby form a recovered $CO_2$ stream; and (c) introducing at least a portion of the recovered $CO_2$ stream into a gasification facility as a feedstock.

In one aspect, the present technology concerns a chemical recycling process. Generally, the process comprises: (a) burning a recycle content fuel (r-fuel) to provide heat to a waste plastic pyrolysis reaction and to thereby form a pyrolysis effluent and a recycle content pyrolysis flue gas (r-pyrolysis flue gas); and (b) recovering recycle content $CO_2$ (r-$CO_2$) from at least a portion of the r-pyrolysis flue gas to thereby form a recovered r-$CO_2$ stream.

DETAILED DESCRIPTION

To optimize the carbon footprint of the recycling facility described herein, we have discovered that a recycle content $CO_2$ stream may be derived from a byproduct stream that was generally burned as fuel, such as a pyrolysis flue gas. More particularly, we have discovered that a recycle content $CO_2$ stream may be formed by treating at least a portion of the pyrolysis flue gas in an absorber system. Consequently, by recovering recycle content $CO_2$ from these under-utilized streams, we can lower the carbon footprint and global warming potential of the pyrolysis facilities described herein.

Figure 1:
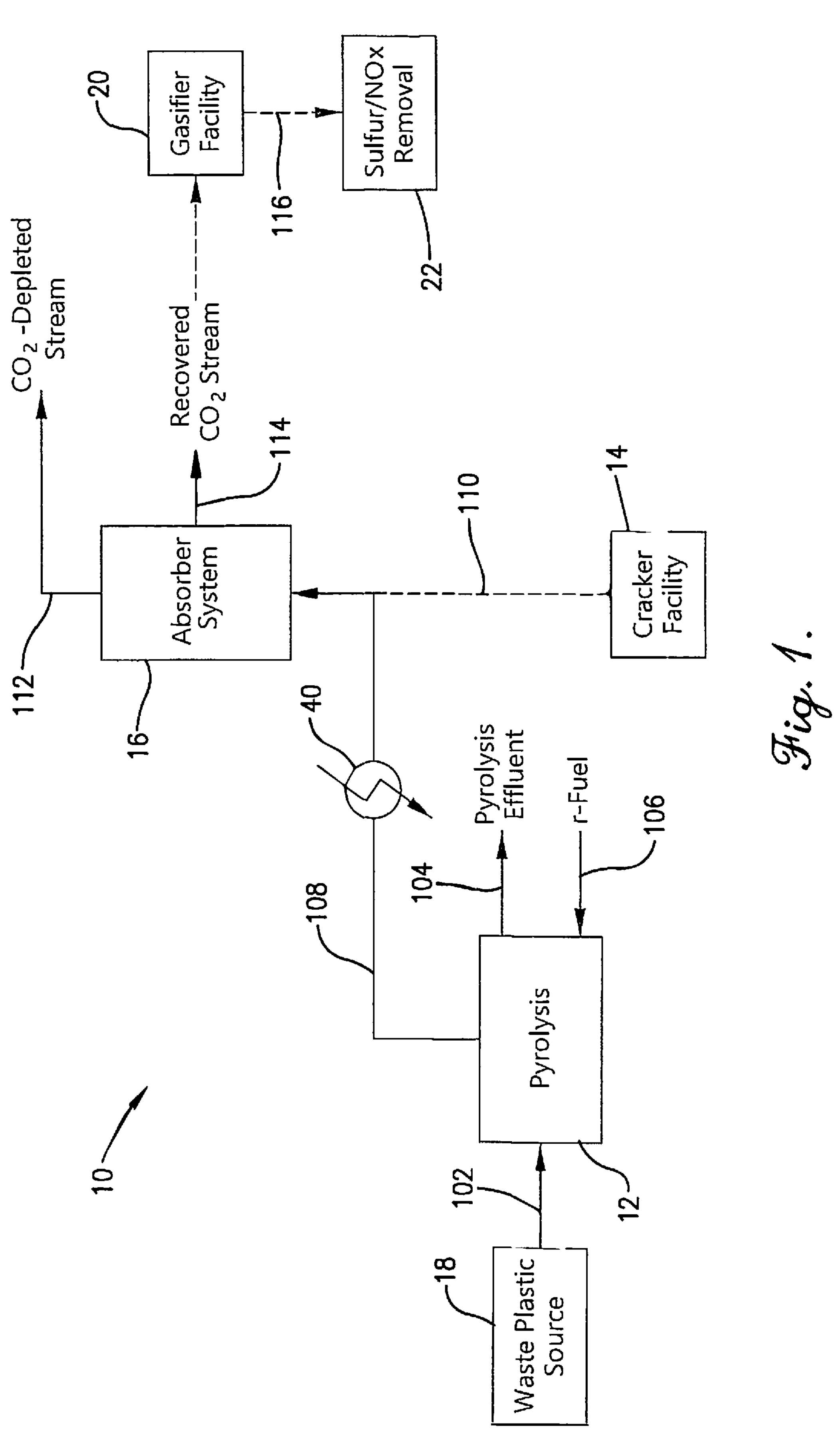
FIG. 1 is a block flow diagram illustrating the main steps of a process and facility for treating pyrolysis flue gas for use in downstream processing to produce recycled chemical products and coproducts.
Figure 2:
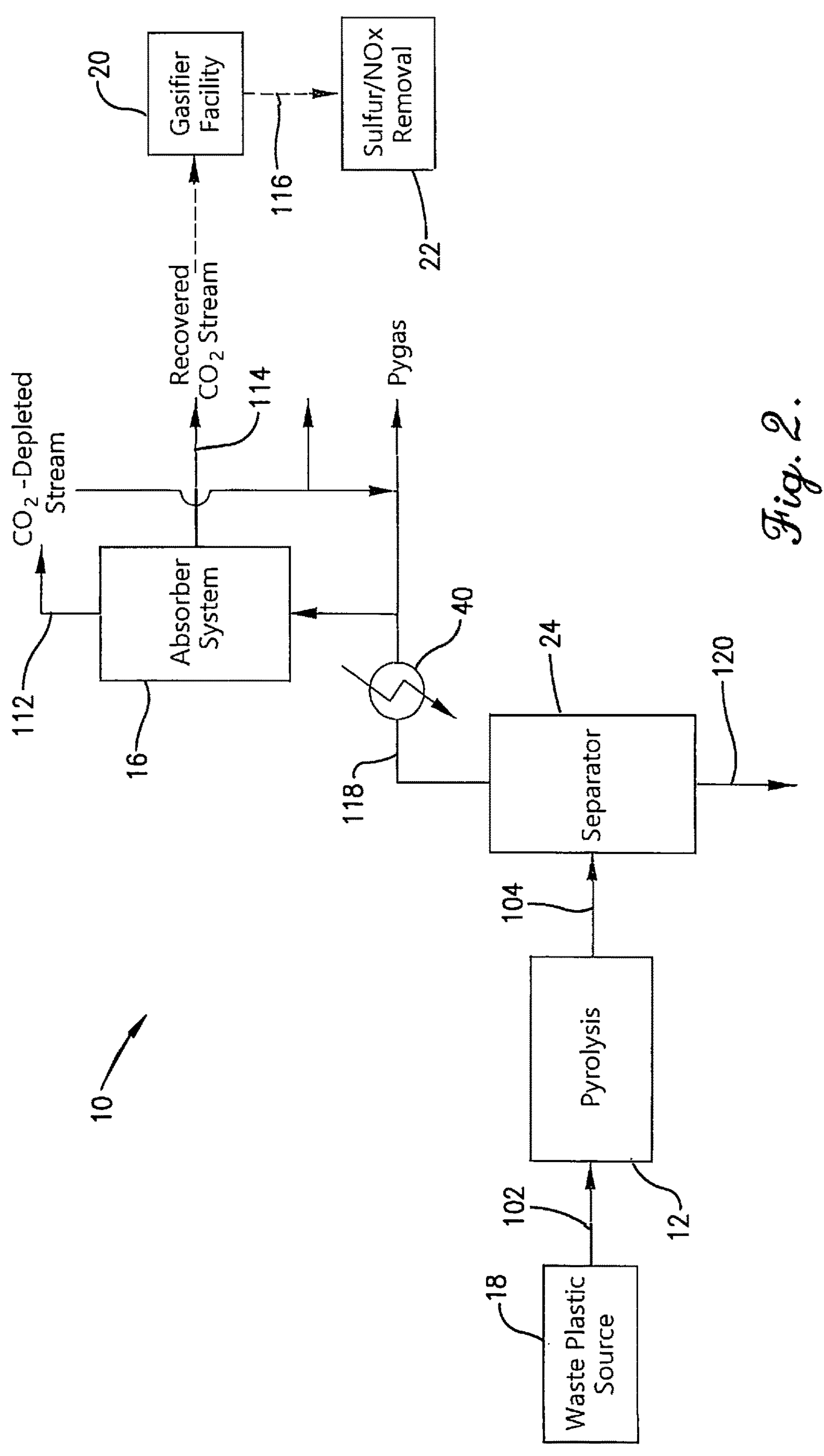
FIG. 2 is a block flow diagram illustrating the main steps of a process and facility for treating recycled content pyrolysis gas for use in downstream processing to produce recycled chemical products and coproducts.

FIGS. 1 and 2 depict an exemplary chemical recycling facility 10 comprising a pyrolysis reactor 12, an absorber system 16, a waste plastic source 18, an optional waste plastic liquification zone (not shown), and a separation zone 24 for forming a pyrolysis gas stream 118 and a pyrolysis gas stream 120. Additionally, as shown in FIG. 1, the pyrolysis reactor may comprise one or more heating systems (e.g., a furnace) comprising one or more burners for heating the pyrolysis reactor 12, which yield a pyrolysis flue gas stream 108. It should be understood that FIGS. 1 and 2 depict exemplary embodiments of the present technology. Certain features depicted in FIGS. 1 and 2 may be omitted and/or additional features described elsewhere herein may be added to the systems depicted in FIGS. 1 and 2. The various process steps, along with the relevant heat transfer media, are described below in greater detail.

Overall Chemical Recycling Facility

Turning now to FIGS. 1 and 2, the main steps of a process for chemically recycling waste plastic in a chemical recycling facility 10 are shown. Chemical recycling processes and facilities as described herein may be used to convert waste plastic to recycle content products or chemical intermediates used to form a variety of end use materials. The waste plastic fed to the chemical recycling facility/process can be mixed plastic waste (MPW), pre-sorted waste plastic, and/or pre-processed waste plastic. As shown in FIGS. 1 and 2, the waste plastic feed stream 102 may be derived from the waste plastic source 18, which may include a waste plastic preprocessing facility.

In an embodiment or in combination with any embodiment mentioned herein, the chemical recycling facility 10 may be a commercial-scale facility capable of processing significant volumes of mixed plastic waste. As used herein, the term "commercial scale facility" refers to a facility having an average annual feed rate of at least 500 pounds per hour, averaged over one year.

In an embodiment or in combination with any embodiment mentioned herein, two or more of the facilities depicted in FIGS. 1 and 2, such as a cracking facility 14, a gasifier facility 20, and the pyrolysis facility (including the pyrolysis reactor 12, the absorber system 16, the waste plastic source 18, the optional waste plastic liquification zone (not shown), and the separation zone 24) may be co-located with one another. As used herein, the term "co-located" refers to facilities in which at least a portion of the process streams and/or supporting equipment or services are shared between the two facilities. When two or more of the facilities are co-located, the facilities may meet at least one of the following criteria (i) through (v): (i) the facilities share at least one non-residential utility service; (ii) the facilities share at least one service group; (iii) the facilities are owned and/or operated by parties that share at least one property boundary; (iv) the facilities are connected by at least one conduit configured to carry at least one process material (e.g., solid, liquid and/or gas fed to, used by, or generated in a facility) from one facility to another; and (v) the facilities are within 40, within 35, within 30, within 20, within 15, within 12, within 10, within 8, within 5, within 2, or within 1 mile of one another, measured from their geographical center. At least one, at least two, at least three, at least four, or all of the above statements (i) through (v) may be true.

Regarding (i), examples of suitable utility services include, but are not limited to, steam systems (co-generation and distribution systems), cooling water systems, heat transfer fluid systems, plant or instrument air systems, nitrogen systems, hydrogen systems, non-residential electrical generation and distribution, including distribution above 8000V, non-residential wastewater/sewer systems, storage facilities, transport lines, flare systems, and combinations thereof.

Regarding (ii), examples of service groups and facilities include, but are not limited to, emergency services personnel (fire and/or medical), a third-party vendor, a state or local government oversight group, and combinations thereof. Government oversight groups can include, for example, regulatory or environmental agencies, as well as municipal and taxation agencies at the city, county, and state level.

Regarding (iii), the boundary may be, for example, a fence line, a property line, a gate, or common boundaries with at least one boundary of a third-party owned land or facility.

Regarding (iv), the conduit may be a fluid conduit that carries a gas, a liquid, a solid/liquid mixture (e.g., slurry), a solid/gas mixture (e.g., pneumatic conveyance), a solid/liquid/gas mixture, or a solid (e.g., belt conveyance). In some cases, two units may share one or more conduits selected from the above list.

Turning again to FIGS. 1 and 2, a stream 102 of waste plastic, which can be mixed plastic waste (MPW), may be introduced into the chemical recycling facility 10 from the waste plastic source 18. As used herein, the terms "waste plastic" and "plastic waste" refer to used, scrap, and/or discarded plastic materials, such as plastic materials typically sent to a landfill. The waste plastic stream 102 fed to the chemical recycling facility 10 may include unprocessed or partially processed waste plastic. As used herein, the term "unprocessed waste plastic" means waste plastic that has not be subjected to any automated or mechanized sorting, washing, or comminuting. Examples of unprocessed waste plastic include waste plastic collected from household curbside plastic recycling bins or shared community plastic recycling containers. Partially processed waste plastics may originate from, for example, municipal recycling facilities (MRFs) or reclaimers. In certain embodiments, the waste plastic may comprise at least one of post-industrial (or pre-consumer) plastic and/or post-consumer plastic.

In an embodiment or in combination with any embodiment mentioned herein, the mixed waste plastic (MPW) includes at least two distinct types of plastic.

In an embodiment or in combination with any embodiment mentioned herein, all or a portion of the MPW in the waste plastic stream 102 can originate from a municipal recycling facility (MRF).

In an embodiment or in combination with any embodiment mentioned herein, all or a portion of the MPW in the waste plastic stream 102 can originate from a reclaimer facility.

Examples of suitable waste plastics can include, but are not limited to, polyolefins (PO), aromatic and aliphatic polyesters, polyvinyl chloride (PVC), polystyrene, cellulose esters, polytetrafluoroethylene, acrylobutadienestyrene (ABS), cellulosics, epoxides, polyamides, phenolic resins, polyacetal, polycarbonates, polyphenylene-based alloys, poly(methyl methacrylate), styrene-containing polymers, polyurethane, vinyl-based polymers, styrene acrylonitrile, and urea-containing polymers and melamines.

Examples of specific polyolefins may include linear low-density polyethylene (LLDPE), low density polyethylene (LDPE), polymethylpentene, polybutene-1, high density polyethylene (HDPE), atactic polypropylene, isotactic polypropylene, syndiotactic polypropylene, crosslinked polyethylene, amorphous polyolefins, and the copolymers of any one of the aforementioned polyolefins.

Examples of polyesters can include those having repeating aromatic or cyclic units such as those containing a repeating terephthalate, isophthalate, or naphthalate units such as PET, modified PET, and PEN, or those containing repeating furanate repeating units. As used herein, "PET" or "polyethylene terephthalate" refers to a homopolymer of polyethylene terephthalate, or to a polyethylene terephthalate modified with one or more acid and/or glycol modifiers and/or containing residues or moieties of other than ethylene glycol and terephthalic acid, such as isophthalic acid, 1,4-cyclohexanedicarboxylic acid, diethylene glycol, 2,2,4,4-tetramethyl-1,3-cyclobutanediol (TMCD), cyclohexanedimethanol (CHDM), propylene glycol, isosorbide, 1,4-butanediol, 1,3-propane diol, and/or neopentyl glycol (NPG).

In an embodiment or in combination with any embodiment mentioned herein, the waste plastic stream 102 comprises at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of one or more polyolefins, based on the total weight of the stream. Alternatively, or in addition, the waste plastic stream 102 comprises not more than 99.9, not more than 99, not more than 97, not more than 92, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, or not more than 5 weight percent of one or more polyolefins, based on the total weight of the stream.

In one embodiment or in combination with any of the mentioned embodiments, the waste plastic stream 102 comprises not more than 20, not more than 15, not more than 12, not more than 10, not more than 8, not more than 6, not more than 5, not more than 4, not more than 3, not more than 2, or not more than 1 weight percent of polyesters, based on the total weight of the stream.

In one embodiment or in combination with any of the mentioned embodiments, the waste plastic stream 102 comprises not more than 20, not more than 15, not more than 12, not more than 10, not more than 8, not more than 6, not more than 5, not more than 4, not more than 3, not more than 2, or not more than 1 weight percent of biowaste materials, based on the total weight of the stream. As used herein, the term "biowaste" refers to material derived from living organisms or of organic origin. Exemplary biowaste materials include, but are not limited to, cotton, wood, saw dust, food scraps, animals and animal parts, plants and plant parts, and manure.

In an embodiment or in combination with any embodiment mentioned herein, the waste plastic stream 102 can include not more than 10, not more than 5, not more than 4, not more than 3, not more than 2, not more than 1, not more than 0.75, or not more than 0.5 weight percent of polyvinyl chloride (PVC), based on the total weight of the stream.

The general configuration and operation of each of the facilities that may be present in the chemical recycling facility shown in FIGS. 1 and 2 will now be described in further detail below, beginning with the optional preprocessing facility of the waste plastic source 18.

Optional Plastic Preprocessing

As shown in FIGS. 1 and 2, unprocessed, partially processed, and/or processed waste plastic, such as mixed plastic waste (MPW), may first be introduced into the chemical recycling facility 10 via the waste plastic stream 102 from the waste plastic source 18. As noted above, the waste plastic source 18 may include an optional preprocessing facility that can prepare the waste plastic feedstock for the downstream recycling processes. While in the optional preprocessing facility, the waste plastic feedstock may undergo one or more preprocessing steps to prepare it for chemical recycling. As used herein, the term "preprocessing facility" refers to a facility that includes all equipment, lines, and controls necessary to carry out the preprocessing of waste plastic. Preprocessing facilities as described herein may employ any suitable method for carrying out the preparation of waste plastic for chemical recycling using one or more of following steps, which are described in further detail below. Alternatively, in certain embodiments, the waste plastic source 18 does not contain a preprocessing facility and the waste plastic stream 102 is not subjected to any preprocessing before any of the downstream chemical recycling steps described herein.

In an embodiment or in combination with any embodiment mentioned herein, the preprocessing facility of the waste plastic source 18 may include at least one separation step or zone. The separation step or zone may be configured to separate the waste plastic stream into two or more streams enriched in certain types of plastics. Such separation is particularly advantageous when the waste plastic fed to the chemical recycling facility 10 is MWP.

Any suitable type of separation device, system, or facility may be employed to separate the waste plastic into two or more streams enriched in certain types of plastics such as, for example, a PET-enriched stream and a PO-enriched stream. Examples of suitable types of separation include mechanical separation and density separation, which may include sink-float separation and/or centrifugal density separation. As used herein, the term "sink-float separation" refers to a density separation process where the separation of materials is primarily caused by floating or sinking in a selected liquid medium, while the term "centrifugal density separation" refers to a density separation process where the separation of materials is primarily caused by centrifugal forces.

Referring again to FIGS. 1 and 2, the waste plastic stream 102 may be introduced into one or more downstream processing facilities (or undergo one or more downstream processing steps) within the chemical recycling facility 10. In an embodiment or in combination with any embodiment mentioned herein, at least a portion of the waste plastic stream 102 may be directly or indirectly introduced into an optional plastic liquification zone (not shown). Additional details of each step, as well as the general integration of each of these steps or facilities with one or more of the others according to one or more embodiments of the present technology are discussed in further detail below.

Optional Liquification/Dehalogenation

Although not depicted in FIGS. 1 and 2, the waste plastic stream 102 may be introduced into an optional plastic liquification zone prior to being introduced into the pyrolysis reactor 12. As used herein, the term "liquification" zone refers to a chemical processing zone or step in which at least a portion of the incoming plastic is liquefied. The step of liquefying plastic can include chemical liquification, physical liquification, or combinations thereof. Exemplary methods of liquefying the plastic introduced in the liquification zone 18 can include: (i) heating/melting; (ii) dissolving in a solvent; (iii) depolymerizing; (iv) plasticizing; and combinations thereof. Additionally, one or more of options (i) through (iv) may also be accompanied by the addition of a blending or liquification agent to help facilitate the liquification (reduction of viscosity) of the polymer material. As such, a variety of rheology modification agents (e.g., solvents, depolymerization agents, plasticizers, and blending agents) can be used the enhance the flow and/or dispersibility of the liquified waste plastic.

When added to the liquification zone, at least 50, at least 55, at least 60, at least 65, at least 70, at least 75, at least 80, at least 85, at least 90, at least 95, or at least 99 weight percent of the plastic (usually waste plastic) originally present in the waste plastic stream 102 undergoes a reduction in viscosity. In some cases, the reduction in viscosity can be facilitated by heating (e.g., addition of steam directly or indirectly contacting the plastic), while, in other cases, it can be facilitated by combining the plastic with a solvent capable of dissolving it. Examples of suitable solvents can include, but are not limited to, alcohols such as methanol or ethanol, glycols such as ethylene glycol, diethylene glycol, triethylene glycol, neopentyl glycol, cyclohexanedimethanol, glycerin, pyrolysis oil, motor oil, and water. This dissolution solvent can be added directly to the liquification vessel, or it can be previously combined with one or more streams fed to the liquification vessel, including the waste plastic stream 102.

In an embodiment or in combination with any embodiment mentioned herein, the dissolution solvent can comprise a stream withdrawn from one or more other facilities within the chemical recycling facility. For example, the solvent can comprise a stream withdrawn from the pyrolysis reactor 12 and/or the separation zone 24. In certain embodiments, the dissolution solvent can be or comprise pyrolysis oil.

In some cases, the waste plastic can be depolymerized such that, for example, the number average chain length of the plastic is reduced by contact with a depolymerization agent. In an embodiment or in combination with any embodiment mentioned herein, at least one of the previously-listed solvents may be used as a depolymerization agent, while, in one or more other embodiments, the depolymerization agent can include an organic acid (e.g., acetic acid, citric acid, butyric acid, formic acid, lactic acid, oleic acid, oxalic, stearic acid, tartaric acid, and/or uric acid) or inorganic acid such as sulfuric acid (for polyolefins). The depolymerization agent may reduce the melting point and/or viscosity of the polymer by reducing its number average chain length.

Further, one or more of the methods of liquifying the waste plastic stream 102 can also include adding at least one blending agent to the plastic stream before, during, or after the liquification process in the liquification vessel. Such blending agents may include for example, emulsifiers and/or surfactants, and may serve to more fully blend the liquified plastic into a single phase, particularly when differences in densities between the plastic components of a mixed plastic stream result in multiple liquid or semi-liquid phases. When used, the blending agent may be present in an amount of at least 0.1, at least 0.5, at least 1, at least 2, or at least 5 weight percent and/or not more than 10, not more than 8, not more than 5, not more than 3, not more than 2, or not more than 1 weight percent, based on the total weight of the waste plastic stream 102, or it can be in a range of from 0.1 to 10 weight percent, 0.5 to 8 weight percent, or 1 to 5 weight percent, based on the total weight of the waste plastic stream 102.

In an embodiment or in combination with any embodiment mentioned herein, a portion of the pyrolysis oil stream 120 withdrawn from the separation zone 24 can be combined with the waste plastic stream 102 to form a liquified plastic. Generally, in such embodiments, all or a portion of the pyrolysis oil stream 120 may be combined with the waste plastic stream 102 prior to introduction into the liquification vessel, or after the waste plastic stream 102 enters the liquification vessel.

In an embodiment or in combination with any embodiment mentioned herein, the liquified plastic stream exiting the optional liquification vessel can have a viscosity of less than 3,000, less than 2,500, less than 2,000, less than 1,500, less than 1,000, less than 800, less than 750, less than 700, less than 650, less than 600, less than 550, less than 500, less than 450, less than 400, less than 350, less than 300, less than 250, less than 150, less than 100, less than 75, less than 50, less than 25, less than 10, less than 5, or less than 1 poise, as measured using a Brookfield R/S rheometer with a V80-40 vane spindle operating at a shear rate of 10 rad/s and a temperature of 350° C.

In an embodiment or in combination with any embodiment mentioned herein, the liquification zone may comprise a melt tank and/or an extruder to facilitate the plastic liquification. Additionally, in certain embodiments, the liquification zone may also contain at least one stripping column and at least one disengagement vessel to facilitate the removal of halogenated compounds that may be formed in the melt tank and/or the extruder.

In an embodiment or in combination with any embodiment mentioned herein, the melt tank and/or the extruder may receive the waste plastic feed stream 102 and heat the waste plastic via heating mechanisms in the melt tank and/or via the extrusion process in the extruder.

In an embodiment or in combination with any embodiment mentioned herein, the melt tank can include one or more continuously stirred tanks. When one or more rheology modification agents (e.g., solvents, depolymerization agents, plasticizers, and blending agents) are used in the liquification zone, such rheology modification agents can be added to and/or mixed with the waste plastic stream 102 in or prior to introduction into the melt tank.

In an embodiment or in combination with any embodiment mentioned herein, the interior space of the liquification vessel, where the plastic is heated, is maintained at a temperature of at least 200, at least 210, at least 220, at least 230, at least 240, at least 250, at least 260, at least 270, at least 280, at least 290, at least 300, at least 310, at least 320, at least 330, at least 340, at least 350, at least 360, at least 370, at least 380, at least 390, or at least 400° C. Additionally, or in the alternative, the interior space of the liquification vessel may be maintained at a temperature of not more than 500, not more than 475, not more than 450, not more than 425, not more than 400, not more than 390, not more than 380, not more than 370, not more than 365, not more than 360, not more than 355, not more than 350, or not more than 345° C. Generally, in one or more embodiments, the interior space of the liquification vessel may be maintained at a temperature ranging from 200 to 500° C., 240 to 425° C., 280 to 380° C., or 320 to 350° C.

In an embodiment or in combination with any embodiment mentioned herein, the plastic fed into the liquification vessel may have a residence time in the liquification vessel of at least 1, at least 5, at least 10, at least 20, at least 30, at least 40, at least 50, or at least 60 minutes and/or not more than 10, not more than 9, not more than 8, not more than 7, not more than 6, not more than 5, not more than 4, or not more than 3 hours.

Generally, in one or more embodiments, the plastic fed into the liquification vessel may have a residence time in the liquification vessel in the range of 1 minute to 10 hours, 30 minutes to 6 hours, or 60 minutes to 4 hours.

In an embodiment or in combination with any embodiment mentioned herein, the pressure within the liquification vessel may be maintained at a range from an absolute vacuum to 100 torr.

In an embodiment or in combination with any embodiment mentioned herein, the liquification zone may optionally contain equipment for removing halogens from the waste plastic stream 102. When the waste plastic is heated in the liquification zone, halogen enriched gases can evolve. By disengaging the evolved halogen-enriched gasses from the liquified plastics, the concentration of halogens in the liquified plastic stream can be reduced.

In an embodiment or in combination with any embodiment mentioned herein, dehalogenation can be promoted by sparging a stripping gas (e.g., steam) into the liquified plastics in the liquification vessel.

In an embodiment or in combination with any embodiment mentioned herein, the liquified plastic stream exiting the liquification zone can have a halogen content of less than 500, less than 400, less than 300, less than 200, less than 100, less than 50, less than 10, less than 5, less than 2, less than 1, less than 0.5, or less than 0.1 ppmv.

If a plastic liquification zone us utilized in the facility 10, at least a portion of the liquified plastic stream may be introduced into a downstream pyrolysis reactor 12 to thereby produce a pyrolysis effluent, including pyrolysis oil and pyrolysis gas.

The Pyrolysis Reaction

As shown in FIGS. 1 and 2, the chemical recycling facility 10 may comprise a pyrolysis facility, including a pyrolysis reactor 12. As used herein, a "pyrolysis facility" is a facility that includes all equipment, lines, and controls necessary to carry out pyrolysis of waste plastic and feedstocks derived therefrom. In certain embodiments, the pyrolysis facility can comprise at least one pyrolysis reactor 12, at least one waste plastic source 18, at least one separation zone 24, and at least one absorber system 16.

Turning back to FIGS. 1 and 2, at least a portion of the plastic stream 102 and/or a liquefied plastic stream (if a plastic liquification zone is present in the facility 10) may be fed to a downstream pyrolysis reactor 12 at a pyrolysis facility so as to produce the pyrolysis effluent stream 104.

In an embodiment or in combination with any embodiment mentioned herein, the plastic stream 102 introduced into the pyrolysis reactor 12 can be in the form of liquified plastic (e.g., liquified, melted, plasticized, depolymerized, or combinations thereof), plastic pellets or particulates, or a slurry thereof.

While in the pyrolysis reactor 12, at least a portion of the feed may be subjected to a pyrolysis reaction that produces a pyrolysis effluent comprising a pyrolysis oil, a pyrolysis gas, and a pyrolysis residue. Generally, the pyrolysis effluent stream 104 exiting the pyrolysis reactor 12 can be in the form of pyrolysis vapors that comprise the pyrolysis gas and uncondensed pyrolysis oil.

Pyrolysis is a process that involves the chemical and thermal decomposition of the introduced feed. Although all pyrolysis processes may be generally characterized by a reaction environment that is substantially free of oxygen, pyrolysis processes may be further defined, for example, by the pyrolysis reaction temperature within the reactor, the residence time in the pyrolysis reactor, the reactor type, the pressure within the pyrolysis reactor, and the presence or absence of pyrolysis catalysts.

In an embodiment or in combination with any embodiment mentioned herein, the pyrolysis reactor 12 can be, for example, a film reactor, a screw extruder, a tubular reactor, a tank, a stirred tank reactor, a riser reactor, a fixed bed reactor, a fluidized bed reactor, a rotary kiln, a vacuum reactor, a microwave reactor, or an autoclave. In various embodiments, the pyrolysis reactor 12 may comprise a film reactor, such as a falling film reactor or an up-flow film reactor.

In an embodiment or in combination with any embodiment mentioned herein, a lift gas and/or a feed gas may be used to introduce the feedstock into the pyrolysis reactor 12 and/or facilitate various reactions within the pyrolysis reactor 12. For instance, the lift gas and/or the feed gas may comprise, consist essentially of, or consist of nitrogen, carbon dioxide, and/or steam. The lift gas and/or feed gas may be added with the feed stream prior to introduction into the pyrolysis reactor 12 and/or may be added directly to the pyrolysis reactor 12. The lift gas and/or feed gas can include steam and/or a reducing gas such as hydrogen, carbon monoxide, and combinations thereof.

Furthermore, the temperature in the pyrolysis reactor 12 can be adjusted so as to facilitate the production of certain end products. In an embodiment or in combination with any embodiment mentioned herein, the pyrolysis temperature in the pyrolysis reactor 12 can range from 325 to 1,100° C., 350 to 900° C., 350 to 700° C., 350 to 550° C., 350 to 475° C., 425 to 1,100° C., 425 to 800° C., 500 to 1,100° C., 500 to 800° C., 600 to 1,100° C., 600 to 800° C., 650 to 1,000° C., or 650 to 800° C.

In an embodiment or in combination with any embodiment mentioned herein, the residence times of the feedstocks within the pyrolysis reactor 12 can be at least 0.1, at least 0.2, at least 0.3, at least 0.5, at least 1,at least 1.2, at least 1.3, at least 2, at least 3, or at least 4 seconds. Alternatively, the residence times of the feedstocks within the pyrolysis reactor 12 can be at least 1, at least 2, at least 3, at least 4, at least 5, at least 6, at least 7, at least 8, at least 9, at least 10, at least 20, at least 30, at least 45, at least 60, at least 75, or at least 90 minutes. Additionally, or alternatively, the residence times of the feedstocks within the pyrolysis reactor 12 can be less than 6, less than 5, less than 4, less than 3, less than 2, less than 1, or less than 0.5 hours. Furthermore, the residence times of the feedstocks within the pyrolysis reactor 12 can be less than 100, less than 90, less than 80, less than 70, less than 60, less than 50, less than 40, less than 30, less than 20, less than 10, less than 9, less than 8, less than 7, less than 6, less than 5, less than 4, less than 3, less than 2, or less than 1 seconds. More particularly, the residence times of the feedstocks within the pyrolysis reactor 12 can range from 0.1 to 10 seconds, 0.5 to 10 seconds, 30 minutes to 4 hours, or 30 minutes to 3 hours, or 1 hour to 3 hours, or 1 hour to 2 hours.

In an embodiment or in combination with any embodiment mentioned herein, the pressure within the pyrolysis reactor 12 can be maintained at atmospheric pressure or within the range of 0.1 to 100 bar, or 0.1 to 60 bar, or 0.1 to 30 bar, or 0.1 to 10 bar, 0.2 to 1.5 bar, or 0.3 to 1.1 bar. As used herein, the term "bar" refers to gauge pressure, unless otherwise noted.

In an embodiment or in combination with any embodiment mentioned herein, a pyrolysis catalyst may be introduced into the waste plastic stream 102 prior to introduction into the pyrolysis reactor 12 and/or introduced directly into the pyrolysis reactor 12. The catalyst can be homogenous or heterogeneous and may include, for example, certain types of zeolites and other mesostructured catalysts. In some embodiments, the pyrolysis reaction may not be catalyzed (e.g., carried out in the absence of a pyrolysis catalyst), but may include a non-catalytic, heat-retaining inert additive, such as sand, in the reactor in order to facilitate the heat transfer. Such catalyst-free pyrolysis processes may be referred to as "thermal pyrolysis."

In one embodiment or in combination with one or more embodiments disclosed herein, the pyrolysis reaction performed in the pyrolysis reactor can be carried out at a temperature of less than 700, less than 650, or less than 600° C. and at least 300, at least 350, or at least 400° C. The feed to the pyrolysis reactor can comprise, consists essentially of, or consists of waste plastic. The feed stream, and/or the waste plastic component of the feed stream, can have a number average molecular weight (Mn) of at least 3000, at least 4000, at least 5000, or at least 6000 g/mole. If the feed to the pyrolysis reactor contains a mixture of components, the Mn of the pyrolysis feed is the weighted average Mn of all feed components, based on the mass of the individual feed components. The waste plastic in the feed to the pyrolysis reactor can include post-consumer waste plastic, post-industrial waste plastic, or combinations thereof.

In certain embodiments, the feed to the pyrolysis reactor 12 comprises less than 5, less than 2, less than 1, less than 0.5, or about 0.0 weight percent coal and/or biomass (e.g., lignocellulosic waste, switchgrass, fats and oils derived from animals, fats and oils derived from plants, etc.), based on the weight of solids in pyrolysis feed or based on the weight of the entire pyrolysis feed. The feed to the pyrolysis reaction can also comprise less than 5, less than 2, less than 1, or less than 0.5, or about 0.0 weight percent of a co-feed stream, including steam, sulfur-containing co-feed streams, and/or non-plastic hydrocarbons (e.g., non-plastic hydrocarbons having less than 50, less than 30, or less than 20 carbon atoms), based on the weight of the entire pyrolysis feed other than water or based on the weight of the entire pyrolysis feed.

Additionally, or alternatively, the pyrolysis reactor 12 may comprise a film reactor, a screw extruder, a tubular reactor, a stirred tank reactor, a riser reactor, a fixed bed reactor, a fluidized bed reactor, a rotary kiln, a vacuum reactor, a microwave reactor, or an autoclave. The reactor 12 may also utilize a feed gas and/or lift gas for facilitating the introduction of the feed into the pyrolysis reactor. The feed gas and/or lift gas can comprise nitrogen and can comprise less than 5, less than 2, less than 1, or less than 0.5, or about 0.0 weight percent of steam and/or sulfur-containing compounds.

In an embodiment or in combination with any embodiment mentioned herein, the pyrolysis reactor 12 may comprise one or more heating systems (not shown) for providing the necessary heat to the pyrolysis reactor 12. Exemplary heating systems may include one or more furnaces comprising one or more burners. Generally, the heating systems may burn a fuel to thereby provide the necessary heat for the pyrolysis reaction.

As shown in FIG. 1, a recycled content fuel ("r-Fuel") 106 may be introduced into the heating system and used to power the necessary components therein (e.g., the burners). The recycle content fuel 106 may include any process stream derived from the facility 10 and may include, for example, recycle content alkanes (e.g., r-methane) and/or recycle content hydrogen derived from the cracker facility 14, absorber system 16, and/or gasifier facility 20. For instance, the r-Fuel may include r-methane and/or r-hydrogen derived from a cracking facility, such as the demethanizer in the cracking facility.

As shown in FIG. 1, the heating system of the pyrolysis reactor 12 may thereby provide a pyrolysis flue gas stream 108. As described below in greater detail, at least a portion of this pyrolysis flue gas stream 108 may be combined with one or more $CO_2$-rich process streams 110, such as a cracker flue gas, from the cracker facility 14 and fed into an absorber system 16 so as to produce a $CO_2$-depleted stream 112 and a recovered $CO_2$ stream 114.

Turning to FIG. 2, at least a portion of the pyrolysis effluent 104 may be separated into the pyrolysis gas stream 118 and pyrolysis oil stream 120 in the separation zone 24. The separation zone 24 can include various types of equipment including, but not limited to a filter system, a multistage separator, a condenser, and/or a quench tower. While the in the separation zone 24, the pyrolysis effluent 104, such as the pyrolysis vapors, may be cooled so as to condense the pyrolysis oil fraction originally present in the pyrolysis effluent 104. As shown in FIG. 2, at least a portion of the pyrolysis gas stream 118 and/or the pyrolysis oil stream 120 may be removed from the facility 10. Additionally, or alternatively, as discussed below in greater detail, at least a portion of the pyrolysis gas stream 118 may be fed into an absorber system 16 so as to produce a $CO_2$-depleted stream 112 and a recovered $CO_2$ stream 114.

In an embodiment or in combination with any embodiment mentioned herein, the pyrolysis effluent 104 may comprise at least 1, at least 5, at least 10, at least 15, at least 20, at least 25, at least 30, at least 35, at least 40, at least 45, at least 50, at least 55, at least 60, at least 65, at least 70, or at least 75 weight percent of the pyrolysis oil, based on the total weight of the stream. Additionally, or alternatively, the pyrolysis effluent 104 may comprise not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, or not more than 25 weight percent of the pyrolysis oil, based on the total weight of the stream. As discussed above, the pyrolysis oil may be in the form of uncondensed vapors in the pyrolysis effluent upon exiting the heated reactor 12; however, these vapors may be subsequently condensed into the resulting pyrolysis oil. The pyrolysis effluent 104 may comprise in the range of 20 to 99 weight percent, 25 to 80 weight percent, 30 to 85 weight percent, 30 to 80 weight percent, 30 to 75 weight percent, 30 to 70 weight percent, or 30 to 65 weight percent of the pyrolysis oil, based on the total weight of the stream.

In an embodiment or in combination with any embodiment mentioned herein, the pyrolysis effluent 104 may comprise at least 1, at least 5, at least 10, at least 15, at least 20, at least 25, at least 30, at least 35, at least 40, at least 45, at least 50, at least 55, at least 60, at least 65, at least 70, at least 75, or at least 80 weight percent of the pyrolysis gas, based on the total weight of the stream. Additionally, or alternatively, the pyrolysis effluent 104 may comprise not more than 99, not more than 95, not more than 90, not more than 85, not more than 80, not more than 75, not more than 70, not more than 65, not more than 60, not more than 55, not more than 50, or not more than 45 weight percent of the pyrolysis gas, based on the total weight of the stream. The pyrolysis effluent 104 may comprise 1 to 90 weight percent, 10 to 85 weight percent, 15 to 85 weight percent, 20 to 80 weight percent, 25 to 80 weight percent, 30 to 75 weight percent, or 35 to 75 weight percent of the pyrolysis gas, based on the total weight of the stream.

In an embodiment or in combination with any embodiment mentioned herein, the pyrolysis effluent 104 may comprise at least 0.5, at least 1, at least 2, at least 3, at least 4, at least 5, at least 6, at least 7, at least 8, at least 9, or at least 10 weight percent of the pyrolysis residue, based on the total weight of the stream. Additionally, or alternatively, the pyrolysis effluent 104 may comprise not more than 60, not more than 50, not more than 40, not more than 30, not more than 25, not more than 20, not more than 15, not more than 10, not more than 9, not more than 8, not more than 7, not more than 6, or not more than 5 weight percent of the pyrolysis residue, based on the total weight of the stream. The pyrolysis effluent 104 may comprise in the range of 0.1 to 25 weight percent, 1 to 15 weight percent, 1 to 8 weight percent, or 1 to 5 weight percent of the pyrolysis residue, based on the total weight of the stream.

The resulting pyrolysis gas stream 118 and/or pyrolysis oil stream 120 may be directly used in various downstream applications based on their formulations. The various characteristics and properties of the pyrolysis oil, pyrolysis gas, and pyrolysis residue are described below. It should be noted that, while all of the following characteristics and properties may be listed separately, it is envisioned that each of the following characteristics and/or properties of the pyrolysis gas, pyrolysis oil, and/or pyrolysis residue are not mutually exclusive and may be combined and present in any combination.

In an embodiment or in combination with any embodiment mentioned herein, the pyrolysis oil may predominantly comprise hydrocarbons having from 4 to 30 carbon atoms per molecule (e.g., C4 to C30 hydrocarbons). As used herein, the term "Cx" or "Cx hydrocarbon," refers to a hydrocarbon compound including "x" total carbons per molecule, and encompasses all olefins, paraffins, aromatics, heterocyclic, and isomers having that number of carbon atoms. For example, each of normal, iso, and tert-butane and butene and butadiene molecules would fall under the general description "C4." The pyrolysis oil may have a C4-C30 hydrocarbon content of at least 55, at least 60, at least 65, at least 70, at least 75, at least 80, at least 85, at least 90, or at least 95 weight percent based on the total weight of the pyrolysis oil stream 120.

In an embodiment or in combination with any embodiment mentioned herein, the pyrolysis oil can predominantly comprise C5 to C25 hydrocarbons, C5 to C22 hydrocarbons, or C5 to C20 hydrocarbons. For example, the pyrolysis oil may comprise at least 55, at least 60, at least 65, at least 70, at least 75, at least 80, at least 85, at least 90, or at least 95 weight percent of C5 to C25 hydrocarbons, C5 to C22 hydrocarbons, or C5 to C20 hydrocarbons, based on the total weight of the pyrolysis oil stream 120.

In an embodiment or in combination with any embodiment mentioned herein, the pyrolysis oil may also include various amounts of olefins and aromatics depending on reactor conditions and whether or not a catalyst is employed. The pyrolysis oil may comprise at least 1, at least 5, at least 10, at least 15, at least 20, at least 25, at least 30, at least 35, or at least 40 weight percent of olefins and/or aromatics, based on the total weight of the pyrolysis oil stream 120. Additionally, or alternatively, the pyrolysis oil may include not more than 90, not more than 80, not more than 70, not more than 60, not more than 50, not more than 45, not more than 40, not more than 35, not more than 30, not more than 25, not more than 20, not more than 15, not more than 10, not more than 5, or not more than 1 weight percent of olefins and/or aromatics, based on the total weight of the pyrolysis oil stream 120. As used herein, the term "aromatics" refers to the total amount (in weight) of any compounds containing an aromatic moiety, such as benzene, toluene, xylene, and styrene.

In an embodiment or in combination with any embodiment mentioned herein, the pyrolysis oil may have a mid-boiling point in the range of 75 to 250° C., 90 to 225° C., or 115 to 190° C. as measured according to ASTM D-5399. As used herein, "mid-boiling point" refers to the median boiling point temperature of the pyrolysis oil, where 50 percent by volume of the pyrolysis oil boils above the mid-boiling point and 50 percent by volume boils below the mid-boiling point.

In an embodiment or in combination with any embodiment mentioned herein, the boiling point range of the pyrolysis oil may be such that at least 90 percent of the pyrolysis oil boils off at a temperature of 250° C., of 280° C., of 290° C., of 300° C., or of 310° C., as measured according to ASTM D-5399.

Turning to the pyrolysis gas, the pyrolysis gas can have a methane content in the range of 1 to 50 weight percent, 5 to 50 weight percent, or 15 to 45 weight percent, based on the total weight of the pyrolysis gas stream 118.

In an embodiment or in combination with any embodiment mentioned herein, the pyrolysis gas can have a C3 and/or C4 hydrocarbon content (including all hydrocarbons having 3 or 4 carbon atoms per molecule) in the range of 10 to 90 weight percent, 25 to 90 weight percent, or 25 to 80 weight percent, based on the total weight of the pyrolysis gas stream 118.

In an embodiment or in combination with any embodiment mentioned herein, the pyrolysis gas can have a combined ethylene and propylene content of at least 25, at least 40, at least 50, at least 60, at least 70, or at least 75 weight percent, based on the total weight of the pyrolysis gas stream 118.

Turning to the pyrolysis residue, in an embodiment or in combination with any embodiment mentioned herein, the pyrolysis residue comprises at least 20, at least 25, at least 30, at least 35, at least 40, at least 45, at least 50, at least 55, at least 60, at least 65, at least 70, at least 75, at least 80, or at least 85 weight percent of C20+ hydrocarbons based on the total weight of the pyrolysis residue. As used herein, "C20+ hydrocarbon" refers to hydrocarbon compounds containing at least 20 total carbons per molecule, and encompasses all olefins, paraffins, and isomers having that number of carbon atoms.

In an embodiment or in combination with any embodiment mentioned herein, at least a portion of the pyrolysis gas stream 118 and/or the pyrolysis oil stream 120 may be routed to one or more other chemical processing facilities, including, for example, a cracking facility. In some embodiments, at least a portion of the pyrolysis gas stream 118 may be routed to an absorber system 16 so as to produce a $CO_2$-depleted stream 112 and a recovered $CO_2$ stream 114.

In an embodiment or in combination with any embodiment mentioned herein, at least a portion of the pyrolysis gas stream 118 and/or the pyrolysis oil stream 120 may be routed through an optional heat exchanger 40 so as to further cool the streams prior to further downstream processing. This heat exchanger 40 may utilize a heat transfer medium to remove heat energy from the pyrolysis gas stream 118 and/or the pyrolysis oil stream 120 via indirect heat exchange. Any conventional heat exchange medium may be used. In certain embodiments, the heat exchange medium comprises steam, water, an oil, a siloxane, a molten metal, a molten salt, or a combination thereof.

In an embodiment or in combination with any embodiment mentioned herein, at least a portion of the pyrolysis gas stream 118 and/or the pyrolysis oil stream 120 may be cooled via indirect heat exchange in heat exchanger 40 to a temperature of not more than 100, not more than 75, or not more than 50° C. In certain embodiments, at least a portion of the pyrolysis gas stream 118 and/or the pyrolysis oil stream 120 may be cooled via indirect heat exchange in heat exchanger 40 to a temperature of 25 to 45 or 30 to 40° C.

It should be noted that heat exchanger 40 can comprise any conventional cross-flow heat exchangers known in the art, such as a transfer line exchanger. In certain embodiments, the heat exchanger may comprise a brazed aluminum heat exchanger comprising a plurality of cooling and warming passes (e.g., cores) disposed therein for facilitating indirect heat exchange between one or more process streams and at least one heat transfer medium stream. Although generally illustrated in FIGS. 1 and 2 as comprising a single core or "shell," it should be understood that the heat exchangers can, in some embodiments, comprise two or more separate core or shells.

The Absorber System

Figure 3:
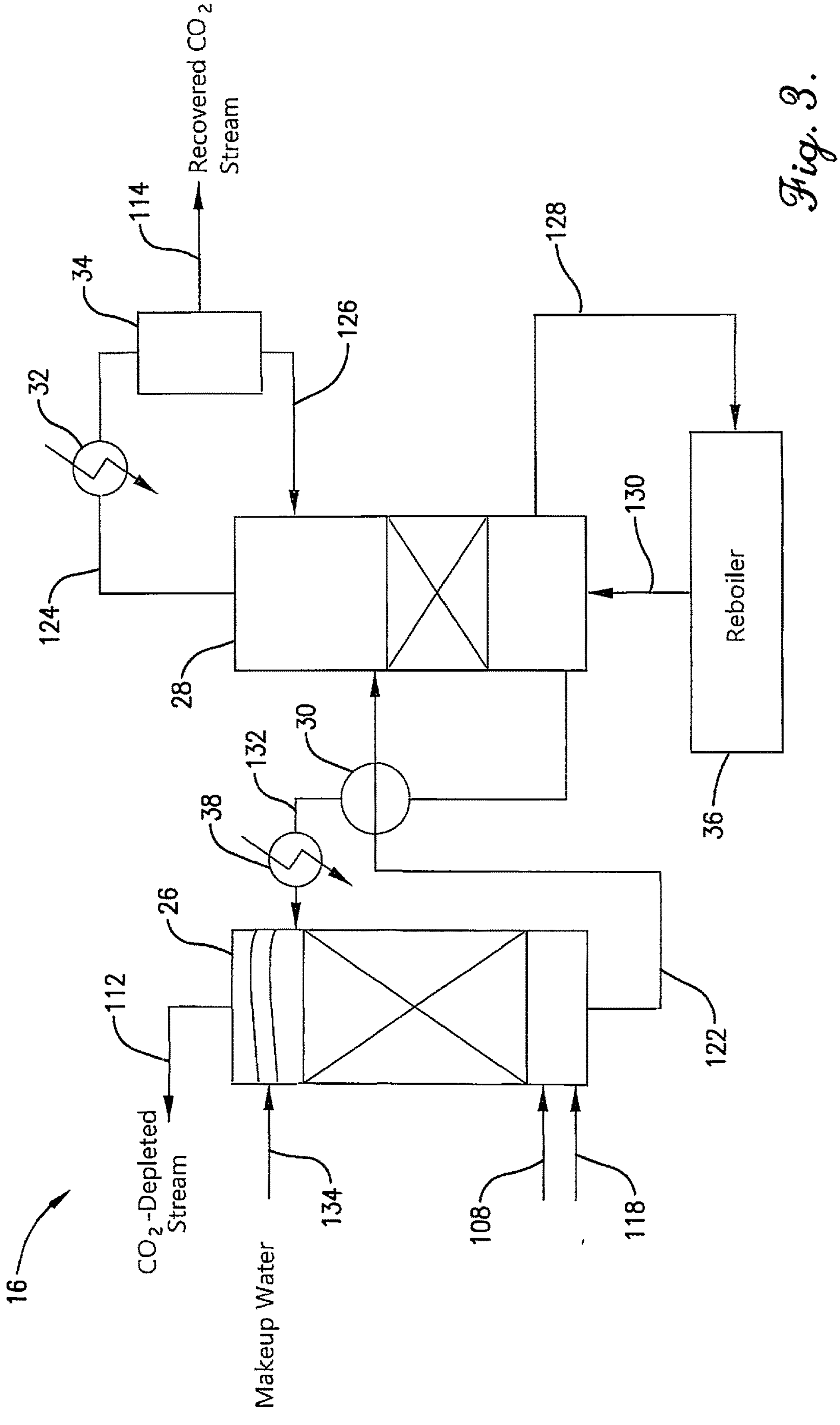
FIG. 3 is a block flow diagram illustrating the main steps of a process for recovering a recovered $CO_2$ stream from a pyrolysis gas and/or a pyrolysis flue gas via an absorber-stripper system.

As noted above, we have discovered that the carbon footprint and global warming potential of the chemical recycling facility 10 may be lowered by recovering (e.g., via capturing and/or sequestering) a recovered $CO_2$ stream 114 from at least a portion of the pyrolysis flue gas stream 108 and/or at least a portion of the pyrolysis gas stream 118. As shown in FIG. 3, at least a portion of the pyrolysis flue gas stream 108 and/or at least a portion of the pyrolysis gas stream 118 may be introduced into an absorber system 16 comprising at least one absorber tower 26 and at least one stripper/regenerator tower 28. Although only a single absorber tower 26 and stripper/regenerator tower 28 are shown in FIG. 3, the absorber-system 16 can comprise one or more absorber towers 26 and one or more stripper/regenerator towers 28. The absorber tower(s) 26 and stripper/regenerator tower(s) 28 may be constructed to appropriate size and specification as understood in the art, based on the compositions of the feed streams and flow rate and the absorber solvent used.

As shown in FIG. 3, at least a portion of the pyrolysis flue gas stream 108 and/or the pyrolysis gas stream 118 may be introduced into one or more absorber towers 26, where the stream(s) contact an absorber solvent (i.e., a lean absorber solvent) that is concurrently introduced into the one or more absorber towers 26. Upon contact, at least a portion of the carbon dioxide and/or other impurities in the pyrolysis flue gas stream 108 and/or the pyrolysis gas stream 118 may be absorbed and removed in the resulting rich absorber solvent stream 122.

Generally, the absorber solvent can comprise an organic solvent. In an embodiment or in combination with any embodiment mentioned herein, the absorber solvent can comprise an absorbing component selected from the group consisting of amines, methanol, sodium hydroxide, sodium carbonate/bicarbonate, potassium hydroxide, potassium carbonate/bicarbonate, SELEXOL®, glycol ether, and combinations thereof. The absorbing component may comprise an amine selected from the group consisting of diethanolamine (DEA), monoethanolamine (MEA), methyldiethanolamine (MDEA), diisopropanolamine (DIPA), diglycolamine (DGA), piperazine, modifications, derivatives, and combinations thereof.

The resulting $CO_2$-depleted stream 112 exits the absorber tower(s) 26 overhead and is generally depleted in carbon dioxide relative to the pyrolysis flue gas stream 108 and/or the pyrolysis gas stream 118 fed into the absorber tower(s) 26.

The absorbed carbon dioxide in the rich absorber solvent stream 122 can be removed from the absorber solvent in the stripper/regeneration tower(s) 28. Within the stripper/regeneration tower(s) 28, the carbon dioxide can be stripped from the rich absorber solvent by contacting the solvent with water/steam. The overhead stream 124 comprising steam and carbon dioxide may then be cooled and at least partially condensed in a condensation tank 34 to remove the carbon dioxide gas, and the residual water stream 126 is recycled back into the stripper/regeneration tower(s) 28. The recovered carbon dioxide gas may be removed as the recovered $CO_2$ stream 114. After $CO_2$ removal, the resulting lean absorber solvent stream 132 may be recycled back to the absorber tower 26. Thus, a regenerative absorber system can be used between the absorber tower 26 and the stripper/regeneration tower(s) 28, where the rich absorber solvent stream 122 is sent from the absorber column 26 to the stripper/regeneration tower(s) 28 via stream 122 and the lean absorber solvent stream 132 is returned from the stripper/regeneration tower(s) 28 to the absorber tower 26.

In certain embodiments, a heat exchanger 32 may be used to further cool and enhance the condensation of the overhead stream 124. This heat exchanger 32 may utilize a heat transfer medium to remove heat energy from the overhead stream 124 via indirect heat exchange. Any conventional heat exchange medium may be used. In certain embodiments, the heat exchange medium comprises steam, water, an oil, a siloxane, a molten metal, a molten salt, or a combination thereof.

The absorber system 16 may further comprise one or more additional components or processes as understood in the art for appropriate operation of the system. For example, in some embodiments, a cross-heat exchanger 30 may be utilized to provide appropriate heating and cooling to the absorber solvent, particularly between the rich absorber solvent stream 122 and the lean absorber solvent stream 132. In some embodiments, an additional heat exchanger 38 may be used to further provide heating/cooling to the lean absorber solvent stream 132 being introduced into the absorber tower 26. This heat exchanger 38 may utilize a heat transfer medium to remove heat energy from the overhead stream 124 via indirect heat exchange. Any conventional heat exchange medium may be used. In certain embodiments, the heat exchange medium comprises steam, water, an oil, a siloxane, a molten metal, a molten salt, or a combination thereof. Additionally, or alternatively, the absorber tower 26 may also comprise a makeup water line 134 to introduce additional water as deemed necessary by the process.

It should be noted that heat exchangers 32 and 38 can comprise any conventional cross-flow heat exchangers known in the art, such as a transfer line exchanger. In certain embodiments, the heat exchangers may comprise a brazed aluminum heat exchanger comprising a plurality of cooling and warming passes (e.g., cores) disposed therein for facilitating indirect heat exchange between one or more process streams and at least one heat transfer medium stream. Although generally illustrated in FIG. 3 as comprising a single core or "shell," it should be understood that the heat exchangers can, in some embodiments, comprise two or more separate core or shells.

As shown in FIG. 3, the stripper/regeneration tower 28 generally comprises at least one reboiler 36, which operates at a temperature high enough to release the carbon dioxide from the absorber solvent, but below the degradation temperature of the absorber solvent. A bottom stream 128 from the stripper/regeneration tower(s) 28 may be introduced into the reboiler 36 to form a vapor overhead stream 130, which is reintroduced back into the stripper/regeneration tower 28. In an embodiment or in combination with any embodiment mentioned herein, the reboiler operates at a temperature of 105 to 150° C., 105 to 145° C., 105 to 140° C., 105 to 130° C., 110 to 125° C., 115 to 120° C.

In an embodiment or in combination with any embodiment mentioned herein, the $CO_2$-depleted stream 112 comprises not more than 1000 ppmv, not more than 500 ppmv, not more than 400 ppmv, not more than 300 ppmv, not more than 200 ppmv, or not more than 100 ppmv carbon dioxide. In some embodiments, the $CO_2$-depleted stream 112 is also depleted in sulfur and/or sulfur-containing compounds (e.g., $H_2S$) relative to the pyrolysis flue gas stream 108 and/or the pyrolysis gas stream 118 fed into the absorber tower(s) 26.

In an embodiment or in combination with any embodiment mentioned herein, the $CO_2$-depleted stream 112 comprises not more than 5, not more than 3, not more than 2, not more than 1.5, not more than 1.0, not more than 0.5, or not more than 0.1 molar percent of $CO_2$, based on the total mole content of the $CO_2$-depleted stream.

In an embodiment or in combination with any embodiment mentioned herein, the $CO_2$-depleted stream 112 comprises not more than 10, not more than 5, not more than 3, not more than 2, not more than 1.5, not more than 1.0, or not more than 0.5 percent of the $CO_2$ originally present in the pyrolysis flue gas stream 108 and/or the pyrolysis gas stream 118.

As shown in FIG. 2, at least a portion of the $CO_2$-depleted stream 112 may be removed from the facility 10. Additionally, or alternatively, at least a portion of the $CO_2$-depleted stream 112 may be combined with at least a portion of the pyrolysis gas stream 118 and removed from the facility 10 for downstream processing or other end products.

In an embodiment or in combination with any embodiment mentioned herein, the recovered $CO_2$ stream 114 is enriched in $CO_2$ concentration relative to the pyrolysis flue gas stream 108 or the pyrolysis gas stream 118. For example, the recovered $CO_2$ stream 114 may comprise at least 30, at least 35, at least 40, at least 45, at least 50, at least 55, at least 60, at least 65, at least 70, at least 75, at least 80, at least 85, at least 90, at least 95, at least 96, at least 97, at least 98, or at least 99 percent of the $CO_2$ originally present in the pyrolysis flue gas stream 108 or the pyrolysis gas stream 118.

Due to the absorber system 16, the recovered $CO_2$ stream 114 comprises a significantly higher amount of $CO_2$ relative to the $CO_2$-depleted stream 112. In an embodiment or in combination with any embodiment mentioned herein, the recovered $CO_2$ stream 114 comprises at least 50, at least 75, at least 80, at least 85, at least 90, at least 95, at least 96, or at least 97 mole percent of $CO_2$, based on the total molar content of the recovered $CO_2$ stream. In such embodiments, at least a portion or all of the recovered $CO_2$ in the recovered $CO_2$ stream 114 may be considered recycle content $CO_2$ since it may be directly and/or indirectly derived from waste plastic. Thus, the recovered $CO_2$ stream 114 may be referred to as a recovered r-$CO_2$ stream that comprises at least 50, at least 75, at least 80, at least 85, at least 90, at least 95, at least 96, or at least 97 mole percent of r-$CO_2$, based on the total molar content of the recovered $CO_2$ stream.

In an embodiment or in combination with any embodiment mentioned herein, the recovered $CO_2$ stream 114 comprises at least 0.1, at least 0.5, at least 1, at least 2, or at least 2.5 and/or not more than 10, not more than 5, not more than 4, or not more than 3 mole percent of water, based on the total molar content of the recovered $CO_2$ stream.

In an embodiment or in combination with any embodiment mentioned herein, the recovered $CO_2$ stream 114 comprises not more than 1,000 ppmv, not more than 500 ppmv, or not more than 200 ppmv of an absorber solvent, based on the total molar content of the recovered $CO_2$ stream.

In an embodiment or in combination with any embodiment mentioned herein, the recovered $CO_2$ stream 114 and/or the $CO_2$-depleted stream 112 has a temperature of at least 25, at least 30, at least 40, at least 45, or at least 50 and/or not more than not more than 100, not more than 75, not more than 70, not more than 65, or not more than 60° C. upon exiting the absorber system 16.

The recovered $CO_2$ stream 114 may be removed from the system and used to produce various end products (e.g., as a feedstock to synthesize various chemicals and food products, such as carbonation) and/or further processed in downstream facilities not depicted in FIGS. 1 and 2.

The global warming potential of the chemical recycling facility 10 and the beneficial effects of the above heat integration steps described above may be calculated according to the ISO 14040:2006 and 14044:2006 standards and the cradle-to-gate methodology described in "Life cycle Metrics for Chemical Products" by WBCSD Chemicals (see Example—steam cracker).

Molecular Reforming

Turning back to FIGS. 1 and 2, at least a portion of the recovered $CO_2$ stream 114 may be introduced into the gasifier facility 20. In an embodiment or in combination with any embodiment mentioned herein, this gasifier facility 20 can comprise a molecular reforming facility. Exemplary molecular reforming facilities can include a partial oxidation (POX) gasification facility or a steam reforming facility. Thus, in such embodiments, the gasifier facility 20 may comprise a POX gasifier or a steam reformer.

The reactions occurring within gasifier facility 20 include conversion of the recovered $CO_2$ stream 114 into syngas, and specific examples include, but are not limited to partial oxidation, water gas shift, water gas-primary reactions, Boudouard, oxidation, methanation, hydrogen reforming, steam reforming, and carbon dioxide reforming.

In an embodiment or in combination with any embodiment mentioned herein, the gasifier facility 20 comprises a POX gasification facility. The feed to POX gasification can include solids, liquids, and/or gases.

In the POX gasification facility, at least a portion of the recovered $CO_2$ stream 114 may be converted to syngas in the presence of a sub-stoichiometric amount of oxygen.

The POX gasification facility includes at least one POX gasification reactor. The POX gasification unit may comprise a gas-fed reactor (or gasifier). In an embodiment or in combination with any embodiment mentioned herein, the POX gasification facility may perform gas-fed POX gasification. As used herein, "gas-fed POX gasification" refers to a POX gasification process where the feed to the process comprises predominately (by weight) components that are gaseous at 25° C. and 1 atm.

Gas-fed POX gasification processes can be co-fed with lesser amounts of other components having a different phase at 25° C. and 1 atm. Thus, gas-fed POX gasifiers can be co-fed with liquids and/or solids, but only in amounts that are less (by weight) than the amount of gasses fed to the gas-phase POX gasifier.

In an embodiment or in combination with any embodiment mentioned herein, the total feed to a gas-fed POX gasifier can comprise at least 60, at least 70, at least 80, at least 90, or at least 95 weight percent of components that are gaseous at 25° C. and 1 atm.

In an embodiment or in combination with any embodiment mentioned herein, the type of gasification technology employed may be a partial oxidation entrained flow gasifier that generates syngas. This technology is distinct from fixed bed (alternatively called moving bed) gasifiers and from fluidized bed gasifiers. An exemplary gasifier that may be used in depicted in U.S. Pat. No. 3,544,291, the entire disclosure of which is incorporated herein by reference to the extent not inconsistent with the present disclosure. However, in an embodiment or in combination with any embodiment mentioned herein, other types of gasification reactors may also be used within the scope of the present technology.

In an embodiment or in combination with any embodiment mentioned herein, the gasification zone, and optionally all reaction zones in the gasifier/gasification reactor, may be operated at a temperature of at least 1000° C., at least 1100° C., at least 1200° C., at least 1250° C., or at least 1300° C. and/or not more than 2500° C., not more than 2000° C., not more than 1800° C., or not more than 1600° C. The reaction temperature may be autogenous. Advantageously, the gasifier operating in steady state mode may be at an autogenous temperature and does not require application of external energy sources to heat the gasification zone.

In an embodiment or in combination with any embodiment mentioned herein, the gasifier may be operated at a pressure within the gasification zone (or combustion chamber) of at least 200 psig (1.38 MPa), at least 300 psig (2.06 MPa), at least 350 psig (2.41 MPa), at least 400 psig (2.76 MPa), at least 420 psig (2.89 MPa), at least 450 psig (3.10 MPa), at least 475 psig (3.27 MPa), at least 500 psig (3.44 MPa), at least 550 psig (3.79 MPa), at least 600 psig (4.13 MPa), at least 650 psig (4.48 MPa), at least 700 psig (4.82 MPa), at least 750 psig (5.17 MPa), at least 800 psig (5.51 MPa), at least 900 psig (6.2 MPa), at least 1000 psig (6.89 MPa), at least 1100 psig (7.58 MPa), or at least 1200 psig (8.2 MPa). Additionally or alternatively, the gasifier may be operated at a pressure within the gasification zone (or combustion chamber) of not more than 1300 psig (8.96 MPa), not more than 1250 psig (8.61 MPa), not more than 1200 psig (8.27 MPa), not more than 1150 psig (7.92 MPa), not more than 1100 psig (7.58 MPa), not more than 1050 psig (7.23 MPa), not more than 1000 psig (6.89 MPa), not more than 900 psig (6.2 MPa), not more than 800 psig (5.51 MPa), or not more than 750 psig (5.17 MPa).

In an embodiment or in combination with any embodiment mentioned herein, the gasifier is a non-slagging gasifier or operated under conditions not to form a slag.

Turning again to FIGS. 1 and 2, the raw syngas stream 116 discharged from the gasification vessel may be further processed in a sulfur removal zone 22 to remove sulfur and sulfur-containing compounds from the raw syngas, so as to produce a purified syngas stream. Any conventional sulfur removal technique known in the art may be used.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the phrase "at least a portion" includes at least a portion and up to and including the entire amount or time period.

As used herein, "aqueous" refers to a fluid containing at least five percent of molecular water by weight.

As used herein, the term "bottom" refers to the physical location of a structure that is below the other noted structures within an enclosed structure. For example, a "bottom" stream is a stream taken from a vessel at a position that is lower elevation-wise to other streams taken from the vessel, such as an "overhead" stream.

As used herein, the term "chemical recycling" refers to a waste plastic recycling process that includes a step of chemically converting waste plastic polymers into lower molecular weight polymers, oligomers, monomers, and/or non-polymeric molecules (e.g., hydrogen, carbon monoxide, methane, ethane, propane, ethylene, and propylene) that are useful by themselves and/or are useful as feedstocks to another chemical production process(es).

As used herein, the term "chemical recycling facility" refers to a facility for producing a recycle content product via chemical recycling of waste plastic.

As used herein, the term "co-located" refers to the characteristic of at least two objects being situated on a common physical site, and/or within one mile of each other.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the term "diameter" means the maximum chord length of a particle (i.e., its largest dimension).

As used herein, the term "depleted" refers to having a concentration (on a dry weight basis) of a specific component that is less than the concentration of that component in a reference material or stream.

As used herein, the term "directly derived" refers to having at least one physical component originating from waste plastic.

As used herein, the term "enriched" refers to having a concentration (on a dry weight basis) of a specific component that is greater than the concentration of that component in a reference material or stream.

As used herein, the term "fluid" may encompass a liquid, a gas, a supercritical fluid, or a combination thereof.

As used herein, the term "halide" refers to a composition comprising a halogen atom bearing a negative charge (i.e., a halide ion).

As used herein, the term "halogen" or "halogens" refers to organic or inorganic compounds, ionic, or elemental species comprising at least one halogen atom.

As used herein, the terms "having," "has," and "have" have the same open-ended meaning as "comprising," "comprises," and "comprise" provided above.

As used herein, a "heat transfer medium loop" or "HTM loop" refers to a system comprising one or more heat exchangers through which a common HTM is circulated to a common HTM supply or a part of a larger system for the purpose of transferring heat and/or energy into and/or out of the chemical recycling process.

As used herein, the terms "including," "include," and "included" have the same open-ended meaning as "comprising," "comprises," and "comprise" provided above.

As used herein, the term "indirectly derived" refers to having an assigned recycle content i) that is attributable to waste plastic, but ii) that is not based on having a physical component originating from waste plastic.

As used herein, the term "isolated" refers to the characteristic of an object or objects being by itself or themselves and separate from other materials, in motion or static.

As used herein, the terms "mixed plastic waste" and "MPW" refer to a mixture of at least two types of waste plastics including, but not limited to the following plastic types: polyethylene terephthalate (PET), one or more polyolefins (PO), and polyvinylchloride (PVC).

As used herein, the term "molecular reforming" refers to partial oxidation (POX) Gasification and steam reforming.

As used herein, the term "molecular reforming facility" refers to a facility that includes all equipment, lines, and controls necessary to carry out molecular reforming of waste plastic and feedstocks derived therefrom.

As used herein, "non-aqueous" refers to a fluid containing less than five percent of molecular water by weight.

As used herein, the term "overhead" refers to the physical location of a structure that is above other noted structures within an enclosed structure. For example, an "overhead" stream is a stream taken from a vessel at a position that is higher elevation-wise to other streams taken from the vessel, such as a "bottom" stream.

As used herein, the term "partially processed waste plastic" means waste plastic that has been subjected to at least on automated or mechanized sorting, washing, or comminuted step or process. Partially processed waste plastics may originate from, for example, municipal recycling facilities (MRFs) or reclaimers. When partially processed waste plastic is provided to the chemical recycling facility, one or more preprocessing steps may me skipped.

As used herein, the term "physical recycling" (also known as "mechanical recycling") refers to a waste plastic recycling process that includes a step of melting waste plastic and forming the molten plastic into a new intermediate product (e.g., pellets or sheets) and/or a new end product (e.g., bottles). Generally, physical recycling does not substantially change the chemical structure of the plastic, although some degradation is possible.

As used herein, the term "plastic" may include any organic synthetic polymers that are solid at 25° C. and 1 atmosphere of pressure.

As used herein, the terms "partial oxidation (POX) gasification" or "POX gasification" refers to high temperature conversion of a carbon-containing feed into syngas, (carbon monoxide, hydrogen, and carbon dioxide), where the conversion is carried out in the presence of a less than stoichiometric amount of oxygen. The feed to POX gasification can include solids, liquids, and/or gases.

As used herein, the term "partial oxidation (POX) reaction" refers to all reactions occurring within a partial oxidation (POX) gasifier in the conversion of a carbon-containing feed into syngas, including but not limited to partial oxidation, water gas shift, water gas—primary reactions, Boudouard, oxidation, methanation, hydrogen reforming, steam reforming, and carbon dioxide reforming.

As used herein, the term "predominantly" means more than 50 percent by weight. For example, a predominantly propane stream, composition, feedstock, or product is a stream, composition, feedstock, or product that contains more than 50 weight percent propane.

As used herein, the term "preprocessing" refers to preparing waste plastic for chemical recycling using one or more of the following steps: (i) comminuting, (ii) particulating, (iii) washing, (iv) drying, and/or (v) separating.

As used herein, the term "pyrolysis" refers to thermal decomposition of one or more organic materials at elevated temperatures in an inert (i.e., substantially oxygen free) atmosphere.

As used herein, the term "pyrolysis char" refers to a carbon-containing composition obtained from pyrolysis that is solid at 200° C. and 1 atm.

As used herein, the terms "pyrolysis gas" and "pygas" refer to a composition obtained from pyrolysis that is gaseous at 25° C. at 1 atm.

As used herein, the term "pyrolysis heavy waxes" refers to C20+ hydrocarbons obtained from pyrolysis that are not pyrolysis char, pyrolysis gas, or pyrolysis oil.

As used herein, the terms "pyrolysis oil" or "pyoil" refers to a composition obtained from pyrolysis that is liquid at 25° C. and 1 atm.

As used herein, the term "pyrolysis residue" refers to a composition obtained from pyrolysis that is not pyrolysis gas or pyrolysis oil and that comprises predominantly pyrolysis char and pyrolysis heavy waxes.

As used herein, the term "recycle content" and "r-content" refer to being or comprising a composition that is directly and/or indirectly derived from waste plastic. Throughout this description, various recycled content components may be denoted by "r-[component]." However, it should be understood that any component that is directly and/or indirectly derived from recycled material may be considered a recycled content component, regardless whether the denotation is used.

As used herein, the term "residual" refers to a remaining quantity or amount of an identified product or component that remains from an original source containing the product or component. For example, a "residual pyrolysis oil" may refer to the remaining pyrolysis oil from an initial pyrolysis effluent after the majority of the pyrolysis oil has been previously removed therefrom.

As used herein, the terms "waste plastic" and "plastic waste" refer to used, scrap, and/or discarded plastic materials. The waste plastic fed to the chemical recycling facility may be unprocessed or partially processed.

As used herein, the term "unprocessed waste plastic" means waste plastic that has not be subjected to any automated or mechanized sorting, washing, or comminuting. Examples of unprocessed waste plastic include waste plastic collected from household curbside plastic recycling bins or shared community plastic recycling containers.

As used herein, the phrase "at least a portion" includes at least a portion and up to and including the entire amount or time period.

As used herein, "downstream" means a target unit operation, vessel, or equipment that:

a. is in fluid (liquid or gas) communication, or in piping communication, with an outlet stream from the radiant section of a cracker furnace, optionally through one or more intermediate unit operations, vessels, or equipment, or b. was in fluid (liquid or gas) communication, or in piping communication, with an outlet stream from the radiant section of a cracker furnace, optionally through one or more intermediate unit operations, vessels, or equipment, provided that the target unit operation, vessel, or equipment remains within the battery limits of the cracker facility (which includes the furnace and all associated downstream separation equipment).

Additional Claim Supporting Description—First Embodiment

In a first embodiment of the present technology there is provided a chemical recycling process, the process comprising: (a) burning a fuel to provide heat to a waste plastic pyrolysis reaction and to thereby form a pyrolysis effluent and a pyrolysis flue gas; (b) recovering $CO_2$ from at least a portion of the pyrolysis flue gas to thereby form a recovered $CO_2$ stream; and (c) introducing at least a portion of the recovered $CO_2$ stream into a gasification facility as a feedstock.

The first embodiment described in the preceding paragraph can also include one or more of the additional aspects/features listed in the following bullet pointed paragraphs. Each of the below additional features of the first embodiment can be standalone features or can be combined with one or more of the other additional features to the extent consistent. Additionally, the following bullet pointed paragraphs can be viewed as dependent claim features having levels of dependency indicated by the degree of indention in the bulleted list (i.e., a feature indented further than the feature(s) listed above it is considered dependent on the feature(s) listed above it).

- wherein the fuel is a recycle content fuel (r-fuel).
- wherein the fuel comprises methane and/or hydrogen.
  - wherein at least a portion of the fuel is derived from a cracking facility.
  - wherein at least a portion of the fuel is derived from a demethanizer.
- wherein the recovered $CO_2$ stream comprises at least 50, at least 75, at least 80, at least 85, at least 90, at least 95, at least 96, or at least 97 mole percent of $CO_2$, based on the total molar content of the recovered $CO_2$ stream.
- wherein the recovered $CO_2$ stream comprises at least 0.1, at least 0.5, at least 1, at least 2, or at least 2.5 and/or not more than 10, not more than 5, not more than 4, or not more than 3 mole percent of water, based on the total molar content of the recovered $CO_2$ stream.

wherein the recovered $CO_2$ stream comprises not more than 1,000 ppmv, not more than 500 ppmv, or not more than 200 ppmv of an absorber solvent, based on the total molar content of the recovered $CO_2$ stream.

wherein the recovered $CO_2$ stream is enriched in $CO_2$ concentration relative to the pyrolysis flue gas.

wherein the recovered $CO_2$ stream comprises at least 30, at least 35, at least 40, at least 45, at least 50, at least 55, at least 60, at least 65, at least 70, at least 75, at least 80, at least 85, at least 90, at least 95, at least 96, at least 97, at least 98, or at least 99 percent of the $CO_2$ originally present in the pyrolysis flue gas.

wherein the introducing comprises feeding at least a portion of the recovered $CO_2$ stream into a gasifier.

wherein the gasifier produces a syngas stream.

further comprising treating at least a portion of the syngas stream to remove at least a portion of sulfur and/or sulfur-containing compounds to thereby form a purified syngas stream.

further comprising combining at least a portion of the pyrolysis flue gas with a cracker flue gas derived from a cracking facility to thereby form a combined flue gas.

wherein the recovering of step (b) comprises introducing at least a portion of the pyrolysis flue gas into an absorber system.

wherein the absorber system comprises an absorber column and a stripper column.

further comprising discharging a $CO_2$-lean overhead stream from the absorber column.

wherein the absorber system circulates at one least one absorber solvent throughout the absorber column and the stripper column.

wherein the absorber solvent comprises an organic solvent.

wherein the absorber solvent comprises an amine.

wherein the absorber solvent comprises an amine, methanol, selexol, glycol ether, or a combination thereof.

wherein the absorber solvent comprises diethanolamine (DEA), monoethanolamine (MEA), methyldiethanolamine (MDEA), diisopropanolamine (DIPA), diglycolamine (DGA), piperazine, or a combination thereof.

wherein the absorber solvent comprises monoethanolamine (MEA).

wherein the absorber system comprises a heat transfer medium (HTM).

wherein the HTM comprises water, steam a synthetic oil, a refined oil, or a siloxane.

wherein the HTM removes heat from and/or applies heat to the absorber solvent.

wherein the stripper column comprises a steam reboiler.

wherein the steam reboiler operates at a temperature that is sufficient to release $CO_2$ and below the degradation temperature of the absorber solvent.

wherein the steam reboiler operates at a temperature in the range of 105 to 150° C., 105 to 145° C., 105 to 140° C., 105 to 130° C., 110 to 125° C., 115 to 120° C.

further comprising discharging the recovered $CO_2$ stream from the stripper column.

wherein the absorber system comprises a regenerative absorber system.

further comprising cooling at least a portion of the pyrolysis flue gas to a temperature of not more than 100, not more than 75, or not more than 50° C. before the recovering of step (b).

further comprising cooling at least a portion of the pyrolysis flue gas to a temperature of 25 to 45 or 30 to 40° C. before the recovering of step (b).

wherein the recovering of step (b) forms a $CO_2$-depleted stream, wherein the recovered $CO_2$ stream comprises a higher $CO_2$ content relative to the $CO_2$-depleted stream.

wherein the $CO_2$-depleted stream comprises not more than 5, not more than 3, not more than 2, not more than 1.5, not more than 1.0, not more than 0.5, or not more than 0.1 molar percent of $CO_2$, based on the total mole content of the $CO_2$-depleted stream.

wherein the $CO_2$-depleted stream comprises not more than 10, not more than 5, not more than 3, not more than 2, not more than 1.5, not more than 1.0, or not more than 0.5 percent of the $CO_2$ originally present in the pyrolysis flue gas.

wherein the recovered $CO_2$ stream and/or the $CO_2$-depleted stream comprises a temperature of at least 25, at least 30, at least 40, at least 45, or at least 50 and/or not more than not more than 100, not more than 75, not more than 70, not more than 65, or not more than 60° C.

An end product comprising the recovered r-$CO_2$ stream.

wherein the recovering comprises sequestering and/or capturing at least a portion of the $CO_2$.

wherein the burning of step (a) occurs in a pyrolysis reactor.

wherein the pyrolysis reactor and gasification facility are co-located.

wherein the pyrolysis reactor and gasification facility are co-located within 40, within 35, within 30, within 20, within 15, within 12, within 10, within 8, within 5, within 2, or within 1 mile of one another, measured from their geographical center.

Additional Claim Supporting Description—Second Embodiment

In a second embodiment of the present technology there is provided a chemical recycling process, the process comprising: (a) burning a recycle content fuel (r-fuel) to provide heat to a waste plastic pyrolysis reaction and to thereby form a pyrolysis effluent and a recycle content pyrolysis flue gas (r-pyrolysis flue gas); and (b) recovering recycle content $CO_2$ (r-$CO_2$) from at least a portion of the r-pyrolysis flue gas to thereby form a recovered r-$CO_2$ stream.

The second embodiment described in the preceding paragraph can also include one or more of the additional aspects/features listed in the following bullet pointed paragraphs. Each of the below additional features of the second embodiment can be standalone features or can be combined with one or more of the other additional features to the extent consistent.

Additionally, the following bullet pointed paragraphs can be viewed as dependent claim features having levels of dependency indicated by the degree of indention in the bulleted list (i.e., a feature indented further than the feature(s) listed above it is considered dependent on the feature(s) listed above it).

further comprising pyrolyzing at least a portion of the heated plastic stream in a pyrolysis reactor to thereby form the pyrolysis effluent and a pyrolysis residue.

wherein the r-fuel comprises methane and/or hydrogen.

wherein at least a portion of the r-fuel is derived from a cracking facility.

wherein at least a portion of the r-fuel is derived from a demethanizer.

wherein the recovered r-$CO_2$ stream comprises at least 50, at least 75, at least 80, at least 85, at least 90, at least 95, at least 96, or at least 97 mole percent of r-$CO_2$, based on the total molar content of the recovered r-$CO_2$ stream.

wherein the recovered r-$CO_2$ stream comprises at least 0.1, at least 0.5, at least 1, at least 2, or at least 2.5 and/or not more than 10, not more than 5, not more than 4, or not more than 3 mole percent of water, based on the total molar content of the recovered r-$CO_2$ stream.

wherein the recovered r-$CO_2$ stream comprises not more than 1,000ppmv, not more than 500 ppmv, or not more than 200 ppmv of an absorber solvent, based on the total weight of the recovered r-$CO_2$ stream.

wherein the recovered r-$CO_2$ stream comprises at least 30, at least 35, at least 40, at least 45, at least 50, at least 55, at least 60, at least 65, at least 70, at least 75, at least 80, at least 85, at least 90, at least 95, at least 96, at least 97, at least 98, or at least 99 percent of $CO_2$ originally present in the pyrolysis flue gas.

wherein the recovered r-$CO_2$ stream is enriched in $CO_2$ concentration relative to the pyrolysis flue gas.

wherein the recovered r-$CO_2$ stream comprises at least 30, at least 35, at least 40, at least 45, at least 50, at least 55, at least 60, at least 65, at least 70, at least 75, at least 80, at least 85, at least 90, at least 95, at least 96, at least 97, at least 98, or at least 99 percent of $CO_2$ originally present in the pyrolysis flue gas further comprising introducing at least a portion of the recovered r-$CO_2$ stream into a gasification facility.

wherein the gasification facility produces a syngas stream.

further comprising treating at least a portion of the syngas stream to remove at least a portion of the sulfur and/or sulfur-containing compounds to thereby form a purified syngas stream.

wherein the burning of step (a) occurs in a pyrolysis reactor.

wherein the pyrolysis reactor and gasification facility are co-located.

wherein the pyrolysis reactor and gasification facility are co-located within 40, within 35, within 30, within 20, within 15, within 12, within 10, within 8, within 5, within 2, or within 1 mile of one another, measured from their geographical center.

further comprising combining at least a portion of the r-pyrolysis flue gas with a cracker flue gas derived from a cracking facility to thereby form a combined flue gas.

An end product comprising the recovered r-$CO_2$ stream.

wherein the end product comprises a food product.

wherein the recovering of step (b) comprises introducing at least a portion of the r-pyrolysis flue gas into an absorber system.

wherein the absorber system comprises an absorber column and a stripper column.

further comprising discharging a $CO_2$-depleted overhead stream from the absorber column.

wherein the absorber system circulates at one least one absorber solvent throughout the absorber column and the stripper column.

wherein the absorber solvent comprises an organic solvent.

wherein the absorber solvent comprises an amine.

wherein the absorber solvent comprises an amine, methanol, selexol, glycol ether, or a combination thereof.

wherein the absorber solvent comprises diethanolamine (DEA), monoethanolamine (MEA), methyldiethanolamine (MDEA), diisopropanolamine (DIPA), diglycolamine (DGA), piperazine, or a combination thereof.

wherein the absorber solvent comprises monoethanolamine (MEA).

wherein the absorber system comprises a heat transfer medium (HTM).

wherein the HTM comprises water, steam a synthetic oil, a refined oil, or a siloxane.

wherein the HTM removes heat from and/or applies heat to the absorber solvent.

wherein the stripper column comprises a steam reboiler.

wherein the steam reboiler operates at a temperature that is sufficient to release $CO_2$ and below the degradation temperature of the absorber solvent.

wherein the steam reboiler operates at a temperature in the range of 105 to 150° C., 105 to 145° C., 105 to 140° C., 105 to 130° C., 110 to 125° C., 115 to 120° C.

further comprising discharging the recovered r-$CO_2$ stream from the stripper column.

wherein the absorber system comprises a regenerative absorber system.

further comprising cooling at least a portion of the r-pyrolysis flue gas to a temperature of not more than 100, not more than 75, or not more than 50° C. before the recovering of step (b).

further comprising cooling at least a portion of the r-pyrolysis flue gas to a temperature of 25 to 45 or 30 to 40° C. before the recovering of step (b).

wherein the recovering of step (b) forms a $CO_2$-depleted stream, wherein the recovered r-$CO_2$ stream comprises a higher $CO_2$ content relative to the $CO_2$-depleted stream.

wherein the $CO_2$-depleted stream comprises not more than 5, not more than 3, not more than 2, not more than 1.5, not more than 1.0, not more than 0.5, or not more than 0.1 molar percent of $CO_2$, based on the total mole content of the $CO_2$-depleted stream.

wherein the $CO_2$-depleted stream comprises not more than 10, not more than 5, not more than 3, not more than 2, not more than 1.5, not more than 1.0, or not more than 0.5 percent of the $CO_2$ originally present in the pyrolysis flue gas.

wherein the recovered r-$CO_2$ stream and/or the $CO_2$-depleted stream comprises a temperature of at least 25, at least 30, at least 40, at least 45, or at least 50 and/or not more than not more than 100, not more than 75, not more than 70, not more than 65, or not more than 60° C.

wherein the recovering comprises sequestering and/or capturing at least a portion of the $CO_2$.

CLAIMS NOT LIMITED TO DISCLOSED EMBODIMENTS

When a numerical sequence is indicated, it is to be understood that each number is modified the same as the first number or last number in the numerical sequence or in the sentence, e.g., each number is "at least," or "up to" or "not more than" as the case may be; and each number is in an "or" relationship. For example, "at least 10, 20, 30, 40, 50, 75 wt. % . . . " means the same as "at least 10 wt. %, or at least 20 wt. %, or at least 30 wt. %, or at least 40 wt. %, or at least 50 wt. %, or at least 75 wt. %," etc.; and "not more than 90 wt. %, 85, 70, 60 . . . " means the same as "not more than 90 wt. %, or not more than 85 wt. %, or not more than 70 wt. % . . . " etc.; and "at least 1%, 2%, 3%, 4%, 5%, 6%, 7%, 8%, 9% or 10% by weight . . . " means the same as "at least 1 wt. %, or at least 2 wt. %, or at least 3 wt. % . . . " etc.; and "at least 5, 10, 15, 20 and/or not more than 99, 95, 90 weight percent" means the same as "at least 5 wt. %, or at least 10 wt. %, or at least 15 wt. % or at least 20 wt. % and/or not more than 99 wt. %, or not more than 95 wt. %, or not more than 90 weight percent . . . " etc.

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A chemical recycling process, the process comprising:

(a) burning a recycle content fuel (r-fuel) to provide heat to a waste plastic pyrolysis reaction and to thereby form a pyrolysis effluent and a pyrolysis flue gas;

(b) recovering $CO_2$ from at least a portion of the pyrolysis flue gas to thereby form a recovered $CO_2$ stream, wherein the recovering of step (b) comprises introducing at least a portion of the pyrolysis flue gas into an absorber system-to produce a $CO_2$-depleted stream and the recovered $CO_2$ stream; and (c) introducing at least a portion of the recovered $CO_2$ stream as a feedstock into a gasification facility.

2. The process according to claim 1, wherein the recovered $CO_2$ stream is enriched in $CO_2$ concentration relative to the pyrolysis flue gas.

3. The process according to claim 2, wherein the recovered CO2 stream comprises at least 75 percent of the $CO_2$ originally present in the pyrolysis flue gas.

4. The process according to claim 1, wherein the recovered $CO_2$ stream comprises at least 90 mole percent of $CO_2$, based on the total molar content of the recovered $CO_2$ stream.

5. The process according to claim 4, wherein the $CO_2$ comprises recycle content $CO_2$.

6. The process according to claim 1, wherein the introducing comprises feeding at least a portion of the recovered $CO_2$ stream into a gasifier.

7. The process according to claim 1, further comprising:

(i) combining at least a portion of the pyrolysis flue gas with a cracker flue gas produced derived from a cracking facility comprising a demethanizer to thereby form a combined flue gas, and ii) feeding the combined flue gas to an absorber system.

8. The process according to claim 1, wherein the recovering of step (b) comprises introducing at least a portion of the pyrolysis flue gas into an absorber system, wherein the absorber system comprises an absorber column and a stripper column.

9. The process according to claim 8, wherein the absorber system circulates at one least one absorber solvent throughout the absorber column and the stripper column, wherein the absorber solvent comprises an amine, methanol, dimethyl ethers of polyethylene glycols, glycol ether, or a combination thereof.

* * * * *